US009872227B2

(12) United States Patent
Shukla et al.

(10) Patent No.: US 9,872,227 B2
(45) Date of Patent: Jan. 16, 2018

(54) SYSTEMS AND METHODS FOR IDENTIFICATION IN A NEIGHBORHOOD AWARE NETWORK

(71) Applicant: QUALCOMM Incorporated, San Diego, CA (US)

(72) Inventors: Ashish Kumar Shukla, Sunnyvale, CA (US); Santosh Paul Abraham, San Diego, CA (US); Alireza Raissinia, Monte Sereno, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 14/250,809

(22) Filed: Apr. 11, 2014

(65) Prior Publication Data
US 2014/0313966 A1 Oct. 23, 2014

Related U.S. Application Data

(60) Provisional application No. 61/815,184, filed on Apr. 23, 2013, provisional application No. 61/822,860, filed on May 13, 2013.

(51) Int. Cl.
H04H 20/71 (2008.01)
H04W 48/10 (2009.01)
H04W 8/00 (2009.01)
H04W 56/00 (2009.01)
H04W 84/18 (2009.01)
(Continued)

(52) U.S. Cl.
CPC .......... *H04W 48/10* (2013.01); *H04W 8/005* (2013.01); *H04W 56/001* (2013.01); *H04W 84/18* (2013.01); *H04W 28/06* (2013.01); *H04W 48/16* (2013.01)

(58) Field of Classification Search
CPC ... H04W 48/10; H04W 8/005; H04W 56/001; H04W 84/18; H04W 48/16; H04W 28/06
USPC ...................................................... 370/312
See application file for complete search history.

(56) References Cited

U.S. PATENT DOCUMENTS

2008/0205385 A1    8/2008  Zeng et al.
2009/0257380 A1*  10/2009  Meier ................. H04W 72/082
                                                       370/329

(Continued)

OTHER PUBLICATIONS

U.S. Appl. No. 61/809,988, filed Apr 9, 2013 has been attached as NPL.*

(Continued)

*Primary Examiner* — Faisal Choudhury
(74) *Attorney, Agent, or Firm* — Knobbe, Martens, Olson & Bear, LLP

(57) ABSTRACT

Methods, devices, and computer program products for synchronization of wireless devices in a peer-to-peer network are described herein. In one aspect, a method of communicating in a neighborhood aware network (NAN) is provided. The method includes generating a NAN frame including one or more of a first address field, a second address field, a third address field, a third address field, and an information element. The method further includes encoding a NAN identifier in at least one of the first address field, the third address field, and the information element. The method further includes transmitting the NAN frame.

82 Claims, 16 Drawing Sheets

(51) Int. Cl.
*H04W 48/16* (2009.01)
*H04W 28/06* (2009.01)

(56) References Cited

U.S. PATENT DOCUMENTS

| | | | | |
|---|---|---|---|---|
| 2010/0165875 | A1* | 7/2010 | Kneckt | H04W 8/005 370/254 |
| 2011/0153773 | A1 | 6/2011 | Vandwalle et al. | |
| 2011/0178883 | A1* | 7/2011 | Granbery | G06Q 20/10 705/16 |
| 2012/0051240 | A1* | 3/2012 | Dwivedi | H04W 76/023 370/252 |
| 2012/0106375 | A1* | 5/2012 | Woo | H04W 84/20 370/252 |
| 2012/0250617 | A1 | 10/2012 | Wentink | |
| 2013/0188628 | A1* | 7/2013 | Lee | H04W 48/14 370/338 |
| 2013/0235859 | A1* | 9/2013 | Sun | H04W 48/08 370/338 |
| 2013/0316705 | A1* | 11/2013 | Kneckt | H04L 67/16 455/435.1 |
| 2014/0302786 | A1* | 10/2014 | Kasslin | H04W 8/005 455/41.2 |
| 2014/0302787 | A1* | 10/2014 | Rantala | H04W 4/008 455/41.2 |
| 2014/0321317 | A1* | 10/2014 | Kasslin | H04W 4/08 370/254 |
| 2015/0023214 | A1* | 1/2015 | Soneda | H04W 40/32 370/254 |
| 2015/0139217 | A1* | 5/2015 | Qi | H04W 56/001 370/350 |

OTHER PUBLICATIONS

"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment 10: Mesh Networking", IEEE STD 802.11s-2011 (Amendment to IEEE STD 802.11-2007 as Amended by IEEE 802.11K-2008, IEEE 802.11R-2008, IEEE 802.11Y-2008, IEEE 802.11W-2009, IEEE 802.11N-2009, IEEE 802.11P-2010, IEEE 802.11Z-2010, IEEE 802.11V-2011, and IEEE 802.11U-2011), IEE, Sep. 10, 2011 (Sep. 10, 2011), pp. 1-126, XP002729821, DOI: 10.1109/IEEESTD.2011.6018236.

International Search Report and Written Opinion—PCT/US2014/034177—ISA/EPO—dated Oct. 1, 2014.

"Wi-Fi Peer-to-Peer (P2P) Specification v1.2", WI-FI Peer-To-Peer (P2P) Specification V1.2, WI-FI Alliance, US, vol. V1.2, Dec. 14, 2011 (Dec. 14, 2011), pp. 1-159, XP008165048, Retrieved from the Internet: URL:https://www.wi-fi.org/knowledge-center/published-specifications.

* cited by examiner

SYSTEMS AND METHODS FOR IDENTIFICATION IN A NEIGHBORHOOD AWARE NETWORK

CROSS-REFERENCE TO RELATED APPLICATIONS

This application claims the benefit of U.S. Provisional Application Nos. 61/815,184, filed Apr. 23, 2013 and 61/822,860, filed May 13, 2013, the entire contents of each of which is incorporated herein by reference.

FIELD

The present application relates generally to wireless communications, and more specifically to systems, methods, and devices for network identification in a peer-to-peer wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), a neighborhood aware network (NAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. To carry out various communications, the devices can coordinate according to one or more network parameters. As such, devices can exchange information to coordinate their activities. Improved systems, methods, and devices for identifying wireless networks and their communication parameters are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method of communicating in a neighborhood aware network (NAN). The method includes generating a NAN frame including one or more of a first address field, a second address field, a third address field, and an information element. The method further includes encoding a NAN identifier in at least one of the first address field, the third address field, and the information element. The method further includes transmitting the NAN frame.

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the first address field can include an A1 field, the second address field can include an A2 field, and the third address field can include an A3 field. In various embodiments, the first address field can include a receiver address field and the second address field can include a destination address field. In various embodiments, the third address field can include a basic service set identifier (BSSID) field. In various embodiments, the NAN identifier can include an organizationally unique identifier (OUI) indicative of a NAN frame. The NAN identifier can further include one or more bits including a hash of an application identifier. The NAN identifier can further include a least-significant octet indicative of a specific NAN. The NAN identifier can further include a least-significant octet indicative of a wildcard NAN. The NAN identifier can further include a secondary identifier indicative of a NAN frame, and the NAN frame can further include a subsequent field indicative of a specific NAN.

In various embodiments, the method can further include setting a multicast flag of the NAN identifier when the NAN identifier can be encoded in the first address field. The method can further include unsetting the multicast flag when the NAN identifier can be encoded in the second address field.

In various embodiments, the method can further include identifying one or more NAN characteristics. The method can further include encoding the one or more NAN characteristics in the NAN identifier. The one or more NAN characteristics can include one or more of: an identifier that the NAN frame can be a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

Another aspect provides a device configured to communicate in a neighborhood aware network (NAN). The device includes a processor configured to generate a NAN frame including one or more of a first address field, a second address field, a third address field, and an information element. The processor can be further configured to encode a NAN identifier in at least one of the first address field, the third address field, and the information element. The device further includes a transmitter configured to transmit the NAN frame.

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the first address field can include an A1 field, the second address field can include an A2 field, and the third address field can include an A3 field. In various embodiments, the first address field can include a receiver address field and the second address field can include a destination address field. In various embodiments, the third address field can include a basic service set identifier (BSSID) field. The NAN identifier can include an organizationally unique identifier (OUI) indicative of a NAN frame. The NAN identifier can further include one or more bits including a hash of an application identifier. The NAN identifier can further include a least-significant octet indicative of a specific NAN. The NAN identifier can further include a least-significant octet indicative of a wildcard NAN. The NAN identifier can further include a secondary identifier indicative of a NAN frame, and the NAN frame can further include a subsequent field indicative of a specific NAN.

In various embodiments, the processor can be further configured to set a multicast flag of the NAN identifier when the NAN identifier can be encoded in the first address field. The processor can be further configured to unset the multicast flag when the NAN identifier can be encoded in the second address field.

In various embodiments, the processor can be further configured to identify one or more NAN characteristics. The processor can be further configured to encode the one or more NAN characteristics in the NAN identifier. The one or more NAN characteristics can include one or more of: an identifier that the NAN frame can be a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

Another aspect provides apparatus for communicating in a neighborhood aware network (NAN). The apparatus includes means for generating a NAN frame including one or more of a first address field, a second address field, a third address field, and an information element. The apparatus further includes means for encoding a NAN identifier in at least one of the first address field, the third address field, and the information element. The apparatus further includes means for transmitting the NAN frame.

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the first address field can include an A1 field, the second address field can include an A2 field, and the third address field can include an A3 field. In various embodiments, the first address field can include a receiver address field and the second address field can include a destination address field. In various embodiments, the third address field can include a basic service set identifier (BSSID) field. The NAN identifier can include an organizationally unique identifier (OUI) indicative of a NAN frame. The NAN identifier can further include one or more bits including a hash of an application identifier. The NAN identifier can further include a least-significant octet indicative of a specific NAN. The NAN identifier can further include a least-significant octet indicative of a wildcard NAN. The NAN identifier can further include a secondary identifier indicative of a NAN frame, and the NAN frame can further include a subsequent field indicative of a specific NAN.

In various embodiments, the apparatus can further include means for setting a multicast flag of the NAN identifier when the NAN identifier can be encoded in the first address field. The apparatus can further include means for unsetting the multicast flag when the NAN identifier can be encoded in the second address field.

In various embodiments, the apparatus can further include means for identifying one or more NAN characteristics. The apparatus can further include means for encoding the one or more NAN characteristics in the NAN identifier. The one or more NAN characteristics can include one or more of: an identifier that the NAN frame can be a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

Another aspect provides a non-transitory computer-readable medium. The medium includes code that, when executed, causes an apparatus to generate a neighborhood aware network (NAN) frame including one or more of a first address field, a second address field, a third address field, and an information element. The medium further includes code that, when executed, causes the apparatus to encode a NAN identifier in at least one of the first address field, the third address field, and the information element. The medium further includes code that, when executed, causes the apparatus to transmit the NAN frame.

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the first address field can include an A1 field, the second address field can include an A2 field, and the third address field can include an A3 field. In various embodiments, the first address field can include a receiver address field and the second address field can include a destination address field. In various embodiments, the third address field can include a basic service set identifier (BSSID) field. The NAN identifier can include an organizationally unique identifier (OUI) indicative of a NAN frame. The NAN identifier can further include one or more bits including a hash of an application identifier. The NAN identifier can further include a least-significant octet indicative of a specific NAN. The NAN identifier can further include a least-significant octet indicative of a wildcard NAN. The NAN identifier can further include a secondary identifier indicative of a NAN frame, and the NAN frame can further include a subsequent field indicative of a specific NAN.

In various embodiments, the medium can further include code that, when executed, causes the apparatus to set a multicast flag of the NAN identifier when the NAN identifier can be encoded in the first address field. The medium can further include code that, when executed, causes the apparatus to unset the multicast flag when the NAN identifier can be encoded in the second address field.

In various embodiments, the medium can further include code that, when executed, causes the apparatus to identify one or more NAN characteristics. The medium can further include code that, when executed, causes the apparatus to encode the one or more NAN characteristics in the NAN identifier. The one or more NAN characteristics can include one or more of: an identifier that the NAN frame can be a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

Another aspect provides a method of communicating in a neighborhood aware network (NAN). The method includes receiving a NAN frame including one or more of a first address field, a second address field, a third address field, and an information element. The method further includes determining a NAN identifier based on at least one of the first address field, the third address field, and the information element.

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the first address field can include an A1 field, the second address field can include an A2 field, and the third address field can include an A3 field. In various embodiments, the first address field can include a receiver address field and the second address field can include a destination address field. In various embodiments, the third address field can include a basic service set identifier (BSSID) field. The NAN identifier can include an organizationally unique identifier (OUI) indicative of a NAN frame. The NAN identifier can further include one or more bits including a hash of an application identifier. The NAN identifier can further include a least-significant octet indicative of a specific NAN. The NAN identifier can further include a least-significant octet indicative of a wildcard NAN. The NAN identifier can further include a secondary identifier indicative of a NAN frame, and the NAN frame can further include a subsequent field indicative of a specific NAN. In various embodiments, a multicast flag of the NAN identifier can be set when the NAN identifier can be encoded in the first address field. The multicast flag can be unset when the NAN identifier can be encoded in the second address field.

In various embodiments, the method can further include decoding one or more NAN characteristics in the NAN identifier. The method can further include applying one or more NAN characteristics. The one or more NAN characteristics can include one or more of: an identifier that the NAN frame can be a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

Another aspect provides a device configured to communicate in a neighborhood aware network (NAN). The device includes a receiver configured to receive a NAN frame including one or more of a first address field, a second address field, a third address field, and an information element. The device further includes a processor configured to determine a NAN identifier based on at least one of the first address field, the third address field, and the information element.

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the first address field can include an A1 field, the second address field can include an A2 field, and the third address field can include an A3 field. In various embodiments, the first address field can include a receiver address field and the second address field can include a destination address field. In various embodiments, the third address field can include a basic service set identifier (BSSID) field. The NAN identifier can include an organizationally unique identifier (OUI) indicative of a NAN frame. The NAN identifier can further include one or more bits including a hash of an application identifier. The NAN identifier can further include a least-significant octet indicative of a specific NAN. The NAN identifier can further include a least-significant octet indicative of a wildcard NAN. The NAN identifier can further include a secondary identifier indicative of a NAN frame, and the NAN frame can further include a subsequent field indicative of a specific NAN. In various embodiments, a multicast flag of the NAN identifier can be set when the NAN identifier can be encoded in the first address field. The multicast flag can be unset when the NAN identifier can be encoded in the second address field.

In various embodiments, the processor can be further configured to decode one or more NAN characteristics in the NAN identifier. The processor can be further configured to apply one or more NAN characteristics. The one or more NAN characteristics can include one or more of: an identifier that the NAN frame can be a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

Another aspect provides an apparatus for communicating in a neighborhood aware network (NAN). The apparatus includes means for receiving a NAN frame including one or more of a first address field, a second address field, a third address field, and an information element. The apparatus further includes means for determining a NAN identifier based on at least one of the first address field, the third address field, and the information element.

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the first address field can include an A1 field, the second address field can include an A2 field, and the third address field can include an A3 field. In various embodiments, the first address field can include a receiver address field and the second address field can include a destination address field. In various embodiments, the third address field can include a basic service set identifier (BSSID) field. The NAN identifier can include an organizationally unique identifier (OUI) indicative of a NAN frame. The NAN identifier can further include one or more bits including a hash of an application identifier. The NAN identifier can further include a least-significant octet indicative of a specific NAN. The NAN identifier can further include a least-significant octet indicative of a wildcard NAN. The NAN identifier can further include a secondary identifier indicative of a NAN frame, and the NAN frame can further include a subsequent field indicative of a specific NAN. A multicast flag of the NAN identifier can be set when the NAN identifier can be encoded in the first address field. The multicast flag can be unset when the NAN identifier can be encoded in the second address field.

In various embodiments, the apparatus can further include means for decoding one or more NAN characteristics in the NAN identifier. The apparatus can further include means for applying one or more NAN characteristics. The one or more NAN characteristics can include one or more of: an identifier that the NAN frame can be a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

Another aspect provides a non-transitory computer-readable medium. The medium includes code that, when executed, causes an apparatus to receive a neighborhood aware network (NAN) frame including one or more of a first address field, a second address field, a third address field, and an information element. The medium further includes code that, when executed, causes the apparatus to determine a NAN identifier based on at least one of the first address field, the third address field, and the information element.

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the first address field can include an A1 field, the second address field can include an A2 field, and the third address field can include an A3 field. In various embodiments, the first address field can include a receiver address field and the second address field can include a destination address field. In various embodiments, the third address field can include a basic service set identifier (BSSID) field. The NAN identifier can include an organizationally unique identifier (OUI) indicative of a NAN frame. The NAN identifier can further include one or more bits including a hash of an application identifier. The NAN identifier can further include a least-significant octet indicative of a specific NAN. The NAN identifier can further include a least-significant octet indicative of a wildcard NAN. The NAN identifier can further include a secondary identifier indicative of a NAN frame, and the NAN frame can further include a subsequent field indicative of a specific NAN. A multicast flag of the NAN identifier can be set when the NAN identifier can be encoded in the first address field. The multicast flag can be unset when the NAN identifier can be encoded in the second address field.

In various embodiments, the medium can further include code that, when executed, causes the apparatus to decode one or more NAN characteristics in the NAN identifier. The medium can further include code that, when executed, causes the apparatus to apply one or more NAN characteristics. The one or more NAN characteristics can include one or more of: an identifier that the NAN frame can be a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

DETAILED DESCRIPTION

Figure 1A:
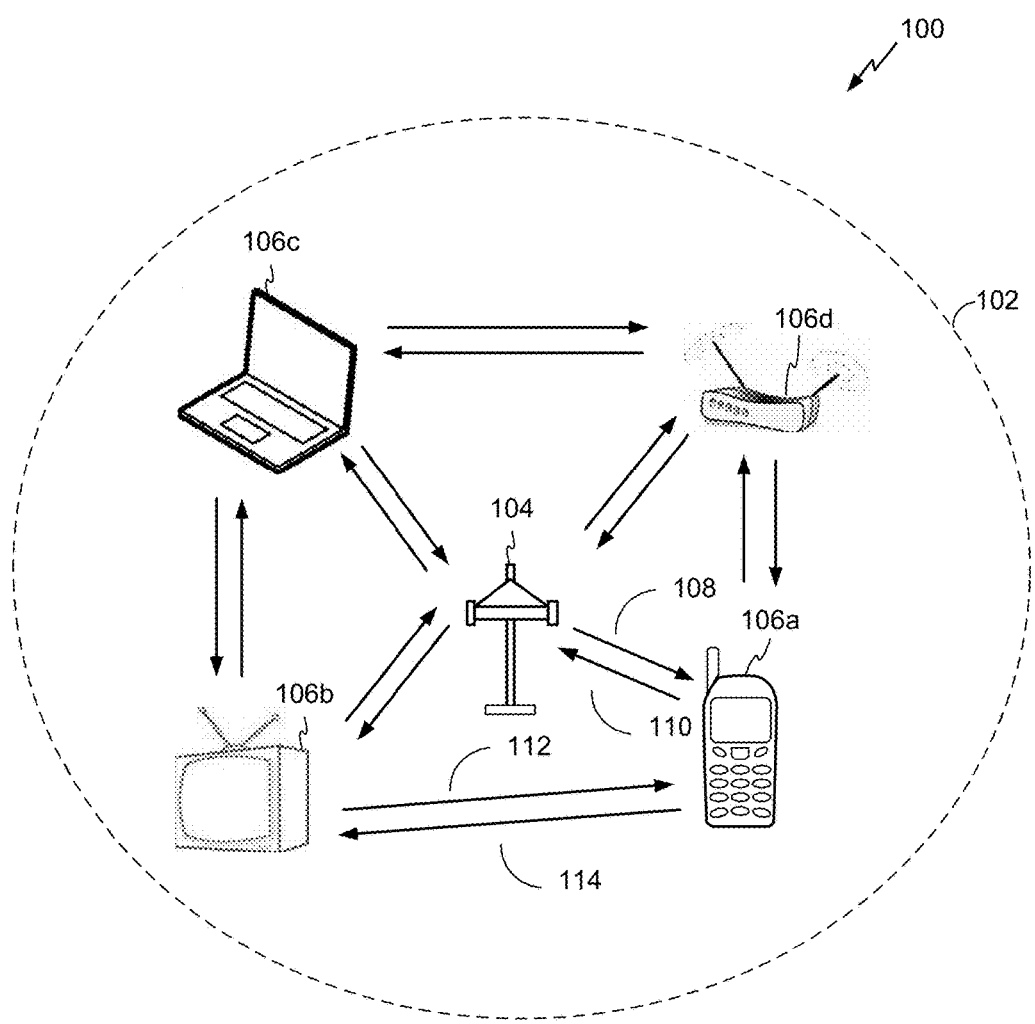
FIG. 1A illustrates an example of a wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. However, the various aspects described herein can apply to any communication standard, such as a wireless protocol.

In some implementations, a WLAN includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, one or more nodes of a peer-to-peer network can transmit synchronization messages to coordinate one or more availability windows for communication between nodes of the peer-to-peer network. The nodes can also exchange discovery queries and responses to provide for service discovery between devices operating within the same peer-to-peer or neighborhood aware network. A neighborhood aware network can be considered a peer-to-peer network or an ad-hoc network in some aspects. The nodes repeatedly wake from a sleep state to periodically transmit and/or receive synchronization messages and discovery messages. It would be advantageous if the nodes 106 were able to stay longer in a sleep state to conserve power and not wake from the sleep state to transmit and/or receive synchronization messages on the network. In addition, the transmission and retransmissions of synchronization and discovery messages by the nodes 106 can introduce a large amount of unnecessary overhead to the network In some embodiments, only a subset of nodes can be configured to transmit synchronization messages, for example, in order to reduce network congestion. In some embodiments, a subset of nodes can be designated or elected "master" nodes. For example, nodes that have access to an external power source can be elected as master nodes, whereas nodes that run on battery power may not. In some embodiments, one or more master nodes can transmit synchronization messages, while other nodes may not. In some embodiments, one or more nodes in a NAN can elect one or more master nodes based on a dynamically determined or preset master preference number (MPN). For example, nodes with access to an external power source can set their MPN higher (e.g., 10), whereas nodes on battery power can set their MPN lower (e.g., 5). During the election process, nodes having a higher MPN can be more likely to be elected master nodes.

In some cases, a master node election process can cause unfairness amongst the nodes. For example, master nodes can consume more power and/or processor resources than non-master nodes. In certain implementations, master nodes can become "locked in" as master nodes, with little or no opportunity to pass on the responsibility of transmitting synchronization messages to other nodes. Moreover, one or more nodes in the NAN may not support the master node election process. In some embodiments, nodes that do not support the master node election process can set their MPN to a predetermined or minimum value. Accordingly, it can be beneficial for some nodes to adopt an inclusive, MPN-compatible, synchronization transmission process.

FIG. 1A illustrates an example of a wireless communication system 100. The wireless communication system 100 can operate pursuant to a wireless standard, such as an 802.11 standard. The wireless communication system 100 can include an AP 104, which communicates with STAs. In some aspects, the wireless communication system 100 can include more than one AP. Additionally, the STAs can communicate with other STAs. As an example, a first STA 106a can communicate with a second STA 106b. As another example, a first STA 106a can communicate with a third STA 106c although this communication link is not illustrated in FIG. 1A.

A variety of processes and methods can be used for transmissions in the wireless communication system 100 between the AP 104 and the STAs and between an individual STA, such as the first STA 106a, and another individual STA, such as the second STA 106b. For example, signals can be sent and received in accordance with OFDM/OFDMA techniques. If this is the case, the wireless communication system 100 can be referred to as an OFDM/OFDMA system. Alternatively, signals can be sent and received between the AP 104 and the STAs and between an individual STA, such as the first STA 106a, and another individual STA, such as the second STA 106b, in accordance with CDMA techniques. If this is the case, the wireless communication system 100 can be referred to as a CDMA system.

A communication link can be established between STAs. Some possible communication links between STAs are illustrated in FIG. 1A. As an example, a communication link 112 can facilitate transmission from the first STA 106a to the second STA 106b. Another communication link 114 can facilitate transmission from the second STA 106b to the first STA 106a.

The AP 104 can act as a base station and provide wireless communication coverage in a basic service area (BSA) 102. The AP 104 along with the STAs associated with the AP 104 and that use the AP 104 for communication can be referred to as a basic service set (BSS).

It should be noted that the wireless communication system 100 may not have a central AP 104, but rather can function as a peer-to-peer network between the STAs. Accordingly, the functions of the AP 104 described herein can alternatively be performed by one or more of the STAs.

Figure 1B:
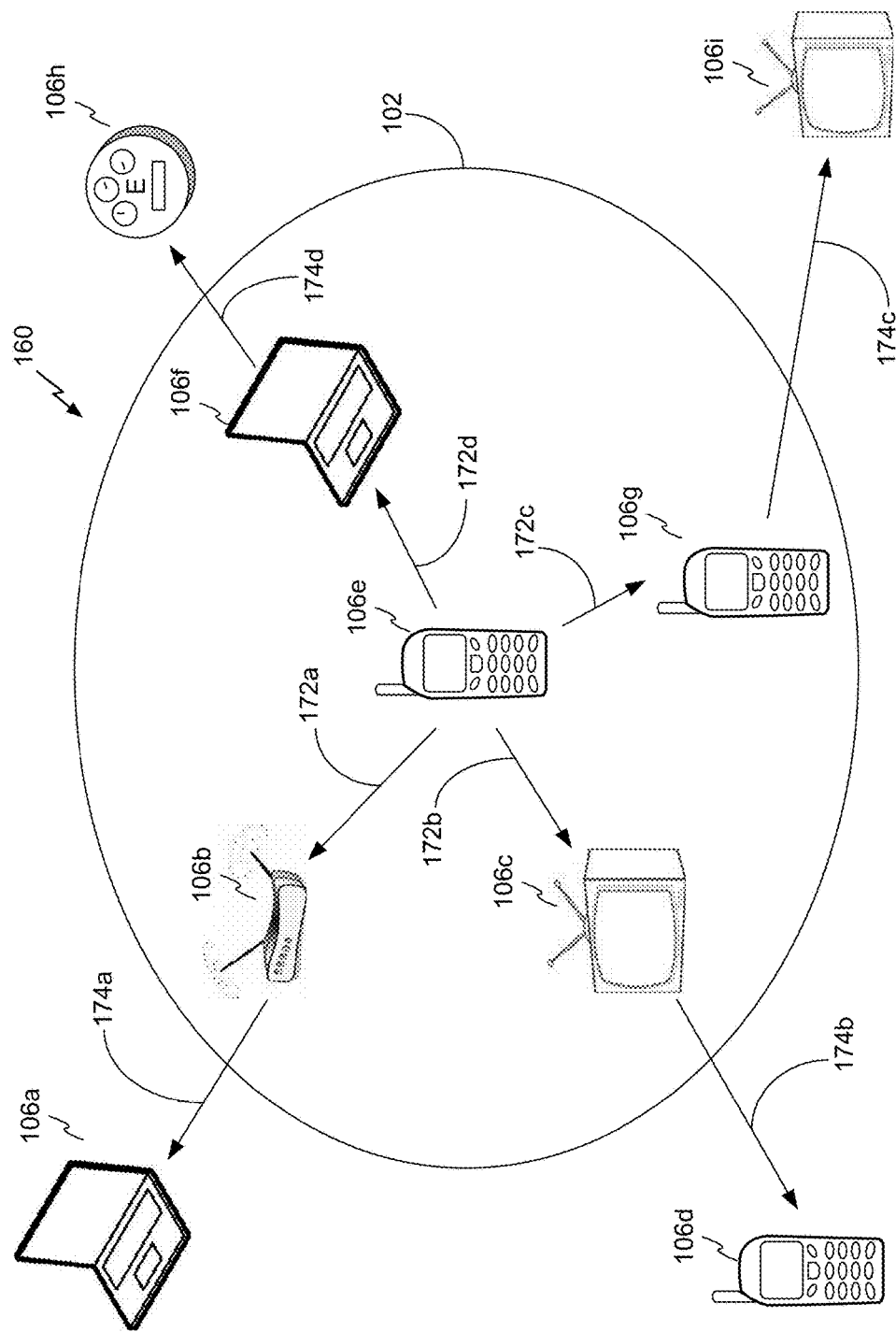
FIG. 1B illustrates another example of a wireless communication system.

FIG. 1B illustrates an example of a wireless communication system 160 that can function as a peer-to-peer network. For example, the wireless communication system 160 in FIG. 1B shows STAs 106a-106i that can communicate with each other without the presence of an AP. As such, the STAs, 106a-106i can be configured to communicate in different ways to coordinate transmission and reception of messages to prevent interference and accomplish various tasks. In one aspect, the networks shown in FIG. 1B can be configured as a "neighborhood aware networking" (NAN).

In one aspect, a NAN can refer to a network for communication between STAs that are located in close proximity to each other. In some cases the STAs operating within the NAN can belong to different network structures (e.g., STAs in different homes or buildings as part of independent LANs with different external network connections).

In some aspects, a communication protocol used for communication between nodes on the peer-to-peer communications network 160 can schedule periods of time during which communication between network nodes can occur. These periods of time when communication occurs between STAs 106a-106i can be known as availability windows. An availability window can include a discovery interval or paging interval as discussed further below.

The protocol can also define other periods of time when no communication between nodes of the network is to occur. In some embodiments, nodes can enter one or more sleep states when the peer-to-peer network 160 is not in an availability window. Alternatively, in some embodiments, portions of the stations 106a-106i can enter a sleep state when the peer-to-peer network is not in an availability window. For example, some stations can include networking hardware that enters a sleep state when the peer-to-peer network is not in an availability window, while other hardware included in the STA, for example, a processor, an electronic display, or the like do not enter a sleep state when the peer-to-peer network is not in an availability window.

The peer-to-peer communication network 160 can assign one nodes to be a root node, or can assign one or more nodes to be master nodes. In FIG. 1B, the assigned root node is shown as STA 106e. In peer-to-peer network 160, the root node is responsible for periodically transmitting synchronization signals to other nodes in the peer-to-peer network. The synchronization signals transmitted by root node 160e can provide a timing reference for other nodes 106a-d and 106f-i to coordinate an availability window during which communication occurs between the nodes. For example, a synchronization message 172a-172d can be transmitted by root node 106e and received by nodes 106b-106c and 106f-106g. The synchronization message 172 can provide a timing source for the STAs 106b-c and 106f-106g. The synchronization message 172 can also provide updates to a schedule for future availability windows. The synchronization messages 172 can also function to notify STAs 106b-106c and 106f-106g that they are still present in the peer-to-peer network 160.

Some of the nodes in the peer-to-peer communication network 160 can function as branch synchronization nodes. A branch synchronization node can retransmit both availability window schedule and master clock information received from a root node. In some embodiments, synchronization messages transmitted by a root node can include availability window schedule and master clock information. In these embodiments, the synchronization messages can be retransmitted by the branch synchronization nodes. In FIG. 1B, STAs 106b-106c and 106f-106g are shown functioning as branch-synchronization nodes in the peer-to-peer communication network 160. STAs 106b-106c and 106f-106g receive the synchronization message 172a-172d from root node 106e and retransmit the synchronization message as retransmitted synchronization messages 174a-174d. By retransmitting the synchronization message 172 from root node 106e, the branch synchronization nodes 106b-106c and 106f-106g can extend the range and improve the robustness of the peer-to-peer network 160.

The retransmitted synchronization messages 174a-174d are received by nodes 106a, 106d, 106h, and 106i. These nodes can be characterized as "leaf" nodes, in that they do not retransmit the synchronization message they receive from either the root node 106e or the branch synchronization nodes 106b-106c or 106f-106g. In some embodiments, a plurality of nodes can negotiate transmission of synchronization signals as discussed in greater detail herein.

Synchronization messages, or synchronization frames, can be transmitted periodically. However, periodic transmission of synchronization messages can be problematic for the nodes 106. These problems can be caused by the nodes 106 having to repeatedly wake from a sleep state to periodically transmit and/or receive synchronization messages. It would be advantageous if the nodes 106 were able to stay longer in a sleep state to conserve power and not wake from the sleep state to transmit and/or receive synchronization messages on the network.

When a new wireless device enters a location with a NAN, the wireless device can scan the airwaves for discovery and synchronization information before joining the NAN. It would be advantageous if the information necessary for the STA to join the NAN was quickly accessible to the STA.

In addition, the transmission and retransmissions of synchronization and/or discovery messages by the nodes 106 within a NAN can introduce a large amount of unnecessary overhead to the network.

Figure 2:
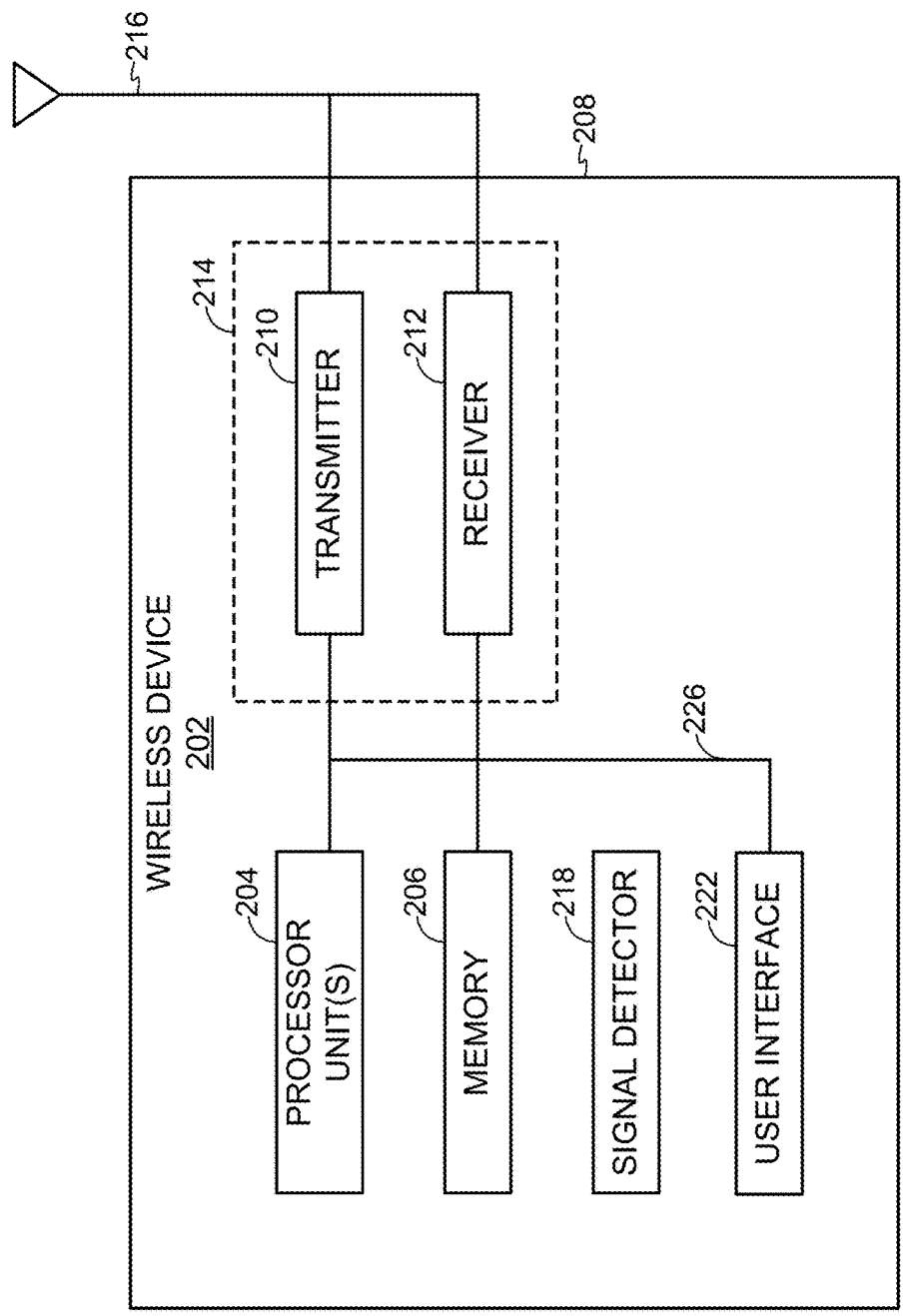
FIG. 2 illustrates a functional block diagram of a wireless device that can be employed within the wireless communication system of FIG. 1.

FIG. 2 illustrates various components that can be utilized in a wireless device 202 that can be employed within the wireless communication system 100 or 160. The wireless device 202 is an example of a device that can be configured to implement the various methods described herein. For example, the wireless device 202 can include the AP 104 or one of the STAs.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 106, the processor 204 can be configured to process packets of a plurality of different packet types. For example, the processor 204 can be configured to determine the type of packet and to process the packet and/or fields of the packet accordingly. When the wireless device 202 is implemented or used as an AP 104, the processor 204 can also be configured to select and generate one of a plurality of packet types. For example, the processor 204 can be configured to generate a discovery packet including a discovery message and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can include a physical layer data unit (PPDU).

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Devices, such as STAs, 106*a*-106*i* shown in FIG. 1B, for example, can be used for neighborhood-aware networking, or NANing. For example, various stations within the network can communicate on a device to device (e.g., peer-to-peer communications) basis with one another regarding applications that each of the stations supports. A discovery protocol can be used in a NAN to enable STAs to advertise themselves (e.g., by sending discovery packets) as well as discover services provided by other STAs (e.g., by sending paging or query packets), while ensuring secure communication and low power consumption.

In a neighborhood-aware or NAN, one device, such as STA or wireless device 202, in the network can be designated as the root device or node. In some embodiments, the root device can be an ordinary device, like the other devices in the network, rather than a specialized device such as a router. In NAN, the root node can be responsible for periodically transmitting synchronization messages, or synchronization signals or frames, to other nodes in the network. The synchronization messages transmitted by root node can provide a timing reference for other nodes to coordinate an availability window during which communication occurs between the nodes. The synchronization message can also provide updates to a schedule for future availability windows. The synchronization messages can also function to notify STAs that they are still present in the peer-to-peer network.

In a Neighborhood aware Network (NAN), STAs on the network can use synchronization messages transmitted by a root STA and retransmitted by branch STAs in order to determine availability windows. During these availability windows, STAs in the NAN can be configured to transmit and/or receive messages from other STAs on the network. At other times, STAs, or portions of STAs, on the NAN can be in a sleep state. For example, an STA on a NAN, such as wireless device 202, can enter a sleep state based at least in part on synchronization messages received from a root node. In some embodiments, STAs on a NAN can enter a sleep mode, where one or more elements of the STA can enter a sleep mode, rather than the entire STA. For example, STA 202 can enter a sleep mode where the transmitter 210, receiver 212, and/or transceiver 214 can enter a sleep mode based on synchronization messages received on a NAN. This sleep mode can enable the STA 202 to conserve power or battery life.

Figure 3:
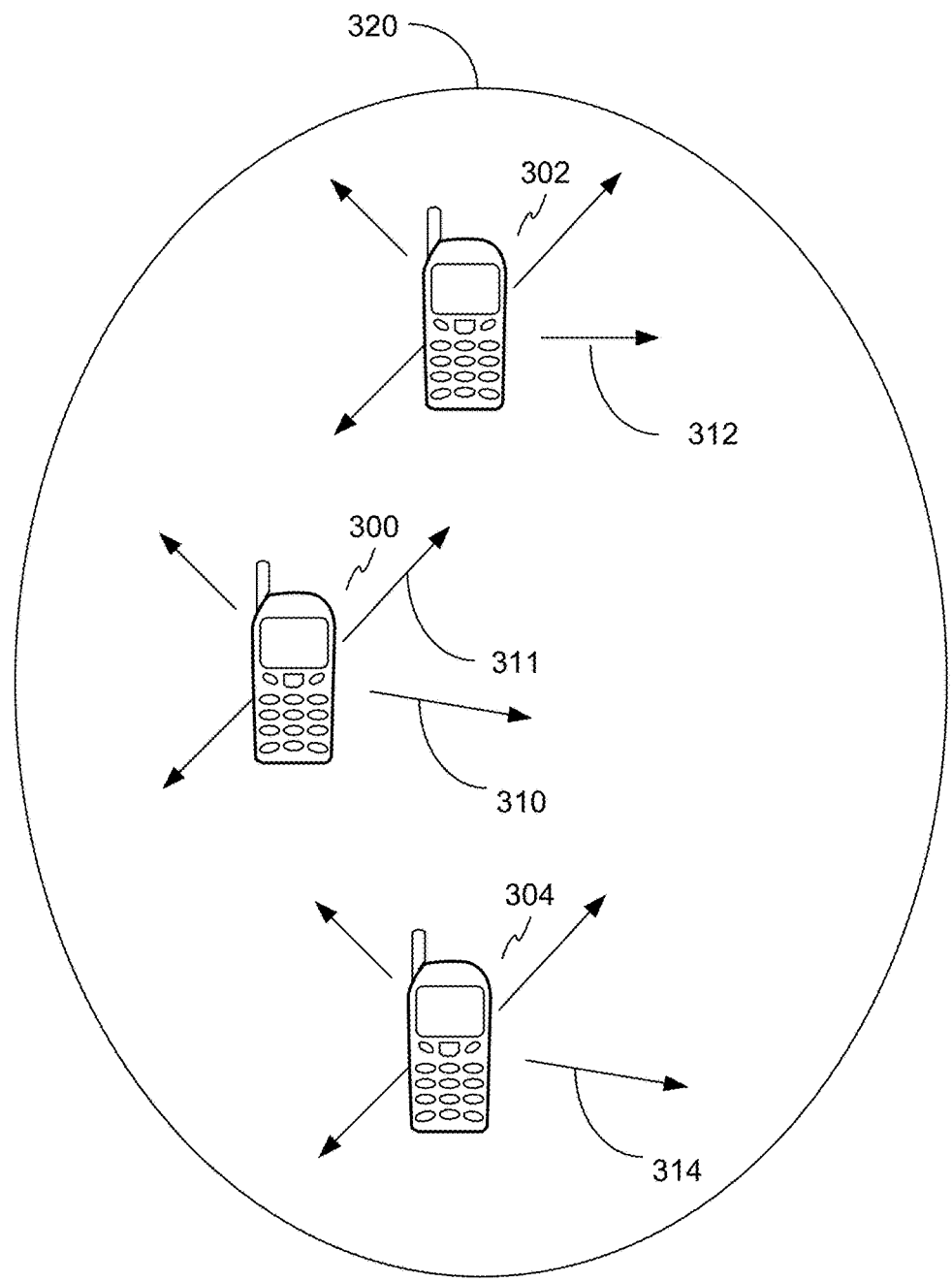
FIG. 3 illustrates an example of a communication system in which aspects of the present disclosure can be employed.

FIG. 3 illustrates an example of a NAN 320 in which aspects of the present disclosure can be employed. A master STA 300 of the network provides synchronization information to the nodes. In this way, the master STA 300 is configured to transmit and receive messages 310, 311, 312, and 314 with the STAs on the NAN 320.

STAs 300, 302, and 304 can be nodes on the NAN 320. As nodes on the NAN 320, STAs 300, 302, and 304 can transmit messages 312, and 314 to other STAs on the network 320. These messages can be transmitted to other STAs during an availability window, during which time each STA is configured to transmit and/or receive transmissions from other STAs on the network 320. For example, STA 302 can transmit messages 312 to STA 304 during an availability window for both STAs, where the availability windows is based in part upon a synchronization message received from a root STA.

Because STAs on the NAN 320 are wireless and can have a finite amount of power between charges, it is advantageous if the STAs do not repeatedly wake from a sleep state to periodically transmit and/or receive synchronization messages between the STAs of the NAN 320. Thus, it would be advantageous if the STAs 300, 302, and 304 were able to stay longer in a sleep state to conserve power and not wake from the sleep state to transmit and/or receive synchronization messages on the network.

Master STA 300 can periodically transmit synchronization messages within the NAN 320. In some embodiments, synchronization messages can indicate the frequency of availability windows for STAs in the network 320, and can further indicate the frequency of synchronization messages and/or the interval until the next synchronization message. In this way, master STA 300 provides synchronization and some discovery functionality to the network 320. Since the master STA may not go to sleep, or can sleep less often than other nodes, the master STA is able to coordinate discovery and timing for the NAN 320 independent of the state of the STAs 302, and 304. In this way, the STAs 302, and 304 rely on the master STA 300 for this functionality and can stay longer in the sleep state to save power.

Figure 4:
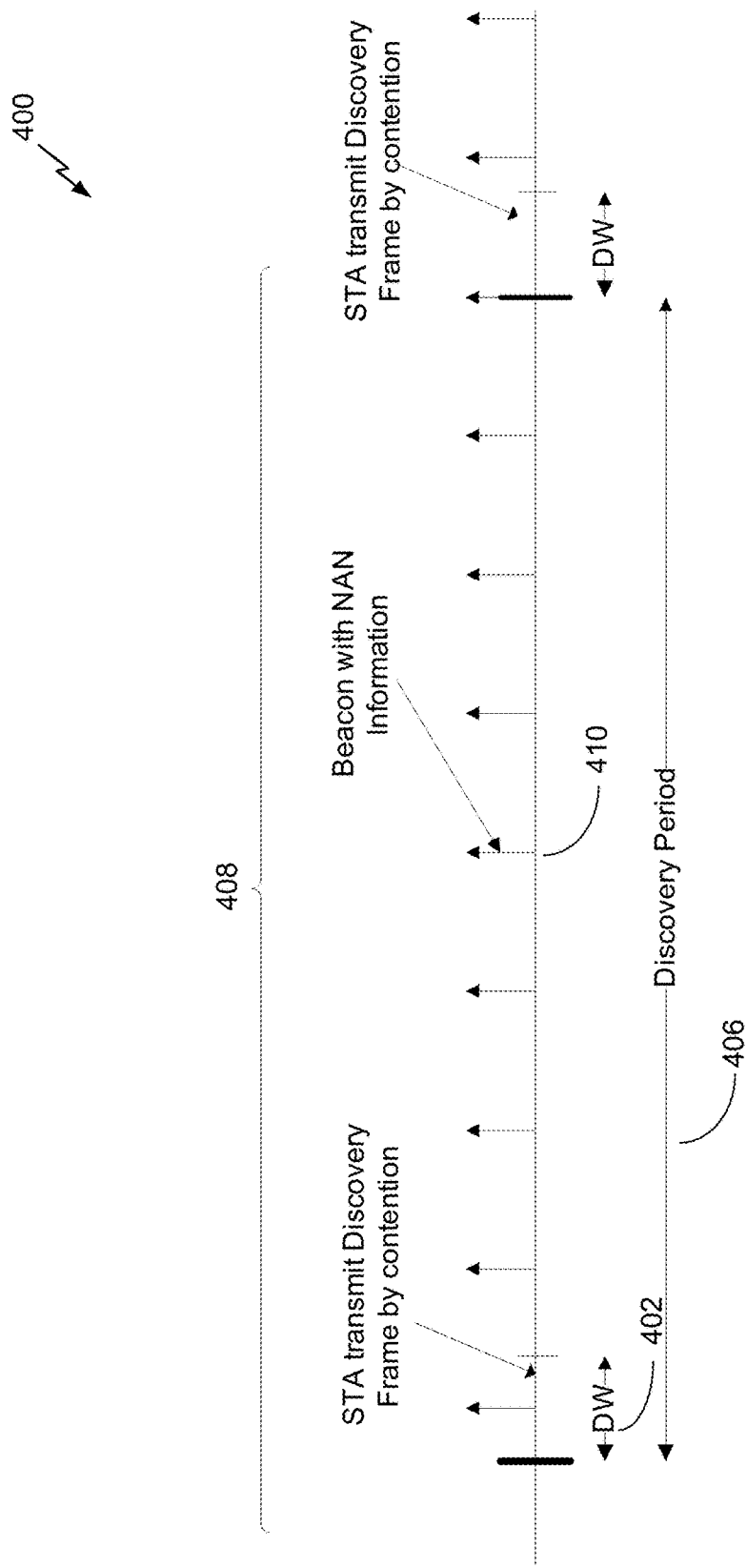
FIG. 4 illustrates an exemplary discovery window structure for an STA to communicate with an AP to discover a NAN in accordance with an exemplary implementation of the invention.

FIG. 4 illustrates an exemplary discovery window structure for an STA to discover the NAN 320 in accordance with an exemplary implementation of the invention. The exemplary discovery window structure 400 can include a discovery window (DW) 402 of time duration 404 and an overall discovery period (DP) 406 interval of time duration 408. In some aspects, communications can occur via other channels as well. Time increases horizontally across the page over the time axis.

During the DW 402, STAs can advertise services through broadcast messages such as discovery packets or discovery frames. STAs can listen to broadcast messages transmitted by other STAs. In some aspects, the duration of DWs can vary over time. In other aspects, the duration of the DW can remain fixed over a period of time. The end of the DW 402 can be separated from the beginning of the subsequent DW by a first remainder period of time as illustrated in FIG. 4.

The overall interval of duration 408 can measure the period of time from the beginning of one DW to the beginning of a subsequent DW as illustrated in FIG. 4. In some embodiments, the duration 408 can be referred to as a discovery period (DP). In some aspects, the duration of the overall interval can vary over time. In other aspects, the duration of the overall interval can remain constant over a period of time. At the conclusion of the overall interval of duration 408, another overall interval can begin, including a DW and the remainder interval. Consecutive overall intervals can follow indefinitely or continue for a fixed period of time. A STA can enter a sleep or power-save mode when the STA is not transmitting or listening or is not expecting to transmit or listen.

Discovery queries are transmitted during the DW 402. STA responses to the transmitted discovery queries are transmitted during the DP 406. As explained below, the allocated time for transmitting responses to the transmitted probe or discovery queries can, for example, overlap with the allocated time for transmitting the discovery queries, be adjacent to the allocated time for transmitting the discovery queries, or be at some time period after the end of the allocated time for transmitting the discovery queries.

The STA which sent the request for a NAN 320 subsequently wakes up to receive a beacon. The STA in the sleep mode or power-save mode can awake or return to normal operation or full power mode at the beginning of the beacon 410 to enable listening by the STA. In some aspects, the STA can awake or return to normal operation or full power mode at other times when the STA expects to communicate with another device, or as a result of receiving a notification packet instructing the STA to awake. The STA can awake early to ensure that the STA receives the beacon 410. The beacon includes an information element, described below, which at least identifies the NAN 320 which is responsive to the probe request of the STA.

The start and end of the DW 402 can be known via numerous methods to each STA desiring to transmit a probe or discovery query. In some aspects, each STA can wait for a beacon. The beacon can specify the start and end of the DW 402.

Figure 5A:
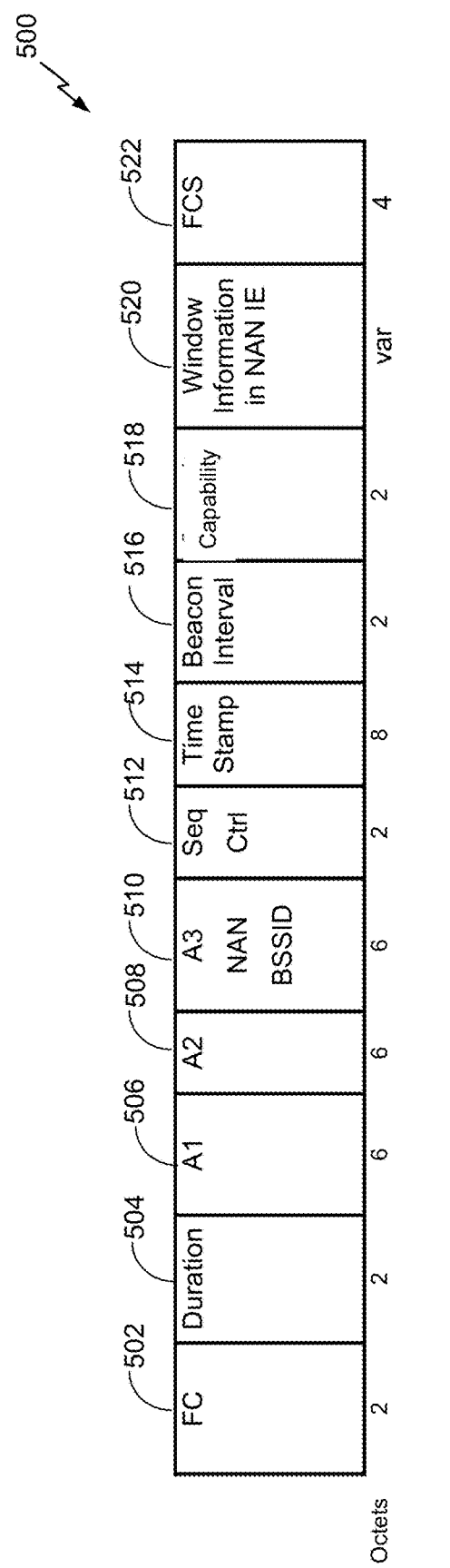
FIG. 5A shows an exemplary structure of a media access control (MAC) frame 500.

FIG. 5A shows an exemplary structure of a media access control (MAC) frame 500. In some aspects, the media access control frame (MAC) 500 can be utilized for the beacon signal 410 discussed above, which in some embodiments can be referred to as a sync beacon. As shown, the MAC frame 500 includes 11 different fields: a frame control (FC) field 502 a duration/identification (dur) field 504, a receiver address (A1) field 506, a transmitter address (A2) field 508, a destination address (A3) field 510, which in some aspects can indicate a NAN BSSID, a sequence control (sc) field 512, a timestamp field 514, a beacon interval field 516, a capability field 518, an information element 520 including window information, and a frame check sequence (FCS) field 522. The fields 502-522 include a MAC header in some aspects. Each field can be included of one or more sub-fields or fields. For example, frame control field 502 of media access control header 500 can be included of multiple subfields, such as a protocol version, type field, subtype field, and other fields. A person having ordinary skill in the art will appreciate that the attribute of the NAN IE 600 can include additional fields, and fields can be rearranged, removed, and/or resized. For example, in various embodiments, the frame 500 can be configured as a synchronization beacon, a discovery beacon or scanning beacon, and/or a multicast or unicast discovery frame. Accordingly, in some embodiments, one or more of the time stamp field 514, beacon interval field 516, capability field 518 and window information field 520 can be omitted or replaced by other payload fields.

In some aspects, the NAN BSSID field 510 can indicate a cluster of NAN devices. In another embodiment, each NAN can have a different (for example, pseudorandom) NAN BSSID 510. In an embodiment, the NAN BSSID 510 can be based on a service application. For example, a NAN created by Application A can have a BSSID 510 based on an identifier of Application A. In some embodiments, the NAN BSSID 510 can be defined by a standards-body. In some embodiments, the NAN BSSID 510 can be based on other contextual information and/or device characteristics such as, for example, a device location, a server-assigned ID, etc. In one example, the NAN BSSID 510 can include a hash of the latitude and longitude location of the NAN. The NAN BSSID field 510 shown is six octets long. In some implementations, NAN BSSID field 510 can be four, five, or eight octets long. In some embodiments, the AP 104 can indicate the NAN BSSID 510 in an information element.

In various embodiments, the frame 500, or another discovery frame, can include the MPN. In an embodiment, the FC field 502 can include the MPN. In an embodiment, the A2 field 508 can include the MPN. In various examples, the entire A2 field 508 can include the MPN, one or more most-significant-bits (MSBs) or least-significant-bits (LSBs) can be replaced with the MPN, etc. In an embodiment, the NAN-BSSID field 510 can include the MPN. In various examples, the entire NAN-BSSID field 510 can include the MPN, one or more most-significant-bits (MSBs) or least-significant-bits (LSBs) can be replaced with the MPN, etc. In an embodiment, the capability field 518 can include the MPN. In an embodiment, one or more information elements (IEs) 520 can include the MPN, for example as an attribute. In one example, the IE 600, described below with respect to FIG. 6, can include the MPN, although other IEs can include the MPN. In various embodiments described herein, fields that include the MPN can alternatively include an indication or representation of the MPN rather than the MPN itself.

In various embodiments, the frame 500, or another discovery frame, can include a NAN identifier. As will be described below with respect to FIG. 5B, the NAN identifier can include, in various embodiments, one or more of: an identifier that the frame 500 is sent for NAN functionality (such as a NAN frame), a device cluster identifier, one or more NAN cluster parameters, a discovery window indicator, a discovery period indicator, a discovery channel indicator, the MPN of a transmitting device, the device capability information 519, the window information 520, the NAN BSSID, a cluster size indication or estimate, a clock accuracy indication, a clock type indication (e.g., GPS), and any other field or indicator described herein. In one embodiment, the receiver address (A1) field 506 can include the NAN identifier. In one embodiment, the destination address (A3) field 510 can include the NAN identifier. In one embodiment, a NAN information element (IE), such as the NAN IE 600 and 650 described below with respect to FIGS. 6A-6B can include the NAN identifier.

In one embodiment, the frame 500 can be configured as a beacon frame. For example, the frame 500 can be sent during the DW 402 (FIG. 4) for synchronization of devices within the same cluster identifier. In an embodiment, the A1 field 506 can include a cluster identifier, the A2 field 508 can include a source address, and the A3 field 510 can include a value indicative that the frame is a NAN frame. In another embodiment, the A1 field 506 can include a value indicative that the frame is a NAN frame, the A2 field 508 can include a source address, and the A3 field 510 can include a cluster identifier. The cluster identifier can have a group cast bit set, for example when in the A1 field 506. The cluster identifier can include, for example, a unique or semi-unique cluster index appended to a NAN OUI as described below with respect to FIG. 5B. The cluster index can be, for example, two bytes. The value indicative that the frame is a NAN frame can include a wild-card cluster index (such as a predetermined cluster index generally indicative of NAN functionality) appended to a NAN OUI as described below with respect to FIG. 5B. The wild-card cluster index can be, for example, two bytes. In various embodiments, the wild-card cluster index can be, for example, 0x00 or 0xFF.

In another embodiment, the frame 500 can be configured as a discovery beacon or scanning beacon. In an embodiment, the A1 field 506 can include a cluster identifier, the A2 field 508 can include a source address, and the A3 field 510 can include a value indicative that the frame is a NAN frame. In another embodiment, the A1 field 506 can include a value indicative that the frame is a NAN frame, the A2 field 508 can include a source address, and the A3 field 510 can include a cluster identifier. The cluster identifier can have a group cast bit set, for example when in the A1 field 506. The cluster identifier can include, for example, a unique or semi-unique cluster index appended to a NAN OUI as described below with respect to FIG. 5B. The cluster index can be, for example, two bytes. The value indicative that the frame is a NAN frame can include a wild-card cluster index (such as a predetermined cluster index generally indicative of NAN functionality) appended to a NAN OUI as described below with respect to FIG. 5B. The wild-card cluster index can be, for example, two bytes. In various embodiments, the wild-card cluster index can be, for example, 0x00 or 0xFF.

In another embodiment, the frame 500 can be configured as a multicast discovery frame. For example, the frame 500 can be a discovery public action frame including one or more service descriptors. In an embodiment, the A1 field 506 can include a cluster identifier, the A2 field 508 can include a source address, and the A3 field 510 can include a value indicative that the frame is a NAN frame. In another embodiment, the A1 field 506 can include a value indicative that the frame is a NAN frame, the A2 field 508 can include a source address, and the A3 field 510 can include a cluster identifier. The cluster identifier can have a group cast bit set, for example when in the A1 field 506. The cluster identifier can include, for example, a unique or semi-unique cluster index appended to a NAN OUI as described below with respect to FIG. 5B. The cluster index can be, for example, two bytes. The value indicative that the frame is a NAN frame can include a wild-card cluster index (such as a predetermined cluster index generally indicative of NAN functionality) appended to a NAN OUI as described below with respect to FIG. 5B. The wild-card cluster index can be, for example, two bytes. In various embodiments, the wild-card cluster index can be, for example, 0x00 or 0xFF.

In another embodiment, the frame 500 can be configured as a unicast discovery frame. For example, the frame 500 can be a discovery public action frame including one or more service descriptors. In an embodiment, the A1 field 506 can include a destination address, the A2 field 508 can include a source address, and the A3 field 510 can include a cluster identification. In another embodiment, the A1 field 506 can include a destination address, the A2 field 508 can include a source address, and the A3 field 510 can include a value indicative that the frame is a NAN frame. The cluster identifier can have a unicast bit set (or a group cast bit unset). The cluster identifier can include, for example, a unique or semi-unique cluster index appended to a NAN OUI as described below with respect to FIG. 5B. The cluster index can be, for example, two bytes. The value indicative that the frame is a NAN frame can include a wild-card cluster index (such as a predetermined cluster index generally indicative of NAN functionality) appended to a NAN OUI as described below with respect to FIG. 5B. The wild-card cluster index can be, for example, two bytes. In various embodiments, the wild-card cluster index can be, for example, 0x00 or 0xFF.

Figure 5B:
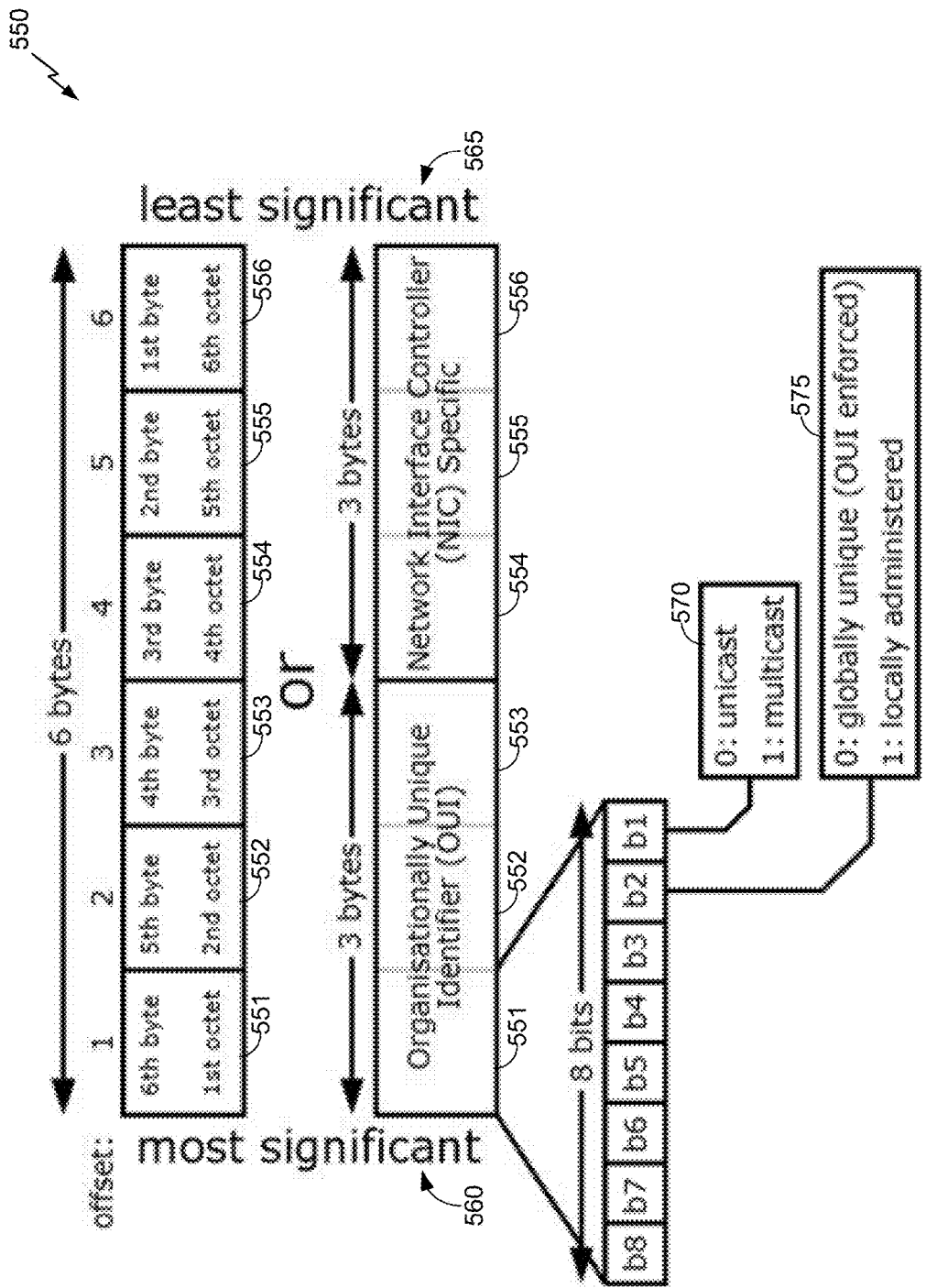
FIG. 5B shows an exemplary NAN identifier that can be employed within the NAN of FIG. 3.

FIG. 5B shows an exemplary NAN identifier 550 that can be employed within the NAN 320 of FIG. 3. As shown, the NAN identifier 550 includes first through sixth octets 551-556. In some embodiments, the octets 551-556 can be divided into an organizationally unique identifier (OUI) 560 and a network interface controller (NIC) specific identifier 565. The first octet 551 can further include a multicast flag 570 and a locally administered address flag 575. A person having ordinary skill in the art will appreciate that the attribute of the NAN IE 600 can include additional fields, and fields can be rearranged, removed, and/or resized.

In the illustrated embodiment, the NAN identifier 550 is formatted as an IEEE 802 MAC address. For example, the NAN identifier 550 includes the OUI identifier 560. In some embodiments, the OUI 560 can include an identifier indicative of a NAN network. For example, a standards body such as IEEE can assign one or more OUIs 560 to NAN networks. In some embodiments, one or more pre-defined OUIs 560 can be stored in a device memory, such as the memory 206 (FIG. 2). Accordingly, in some embodiments, NAN devices 202 (FIG. 2) are able to identify NAN networks globally. In some embodiments, formatting the NAN identifier 550 as a MAC address can increase legacy compatibility. In some embodiments, the NAN identifier 550 can have another format.

As discussed above, in some embodiments, one or more OUIs 560 can indicate a NAN network frame. In some embodiments, one or more NAN-specific OUIs 560, combined with one or more additional NAN-specific bits in the fourth through sixth octets 554-556, can indicate a NAN network frame. In some embodiments, one or more additional NAN-specific bits in the fourth through sixth octets 554-556 can indicate a specific NAN network. In some embodiments, one or more bits in the fourth through sixth octets 554-556 can include one or more other NAN indicators such as, for example, a device cluster identifier, one or more NAN cluster parameters, a discovery window indicator, a discovery period indicator, a discovery channel indicator, the MPN of a transmitting device, the device capability information 519, the window information 520, the NAN BSSID, a cluster size indication or estimate, a clock accuracy indication, a clock type indication (e.g., GPS), and any other field or indicator described herein.

For example, in one embodiment, the sixth octet 556 can indicate a specific NAN. In an embodiment, a particular NAN value (for example, 0xFF) can indicate a wildcard NAN that should always be processed (for example, when a new device has not yet joined a NAN network). In some embodiments, the fourth through sixth octets 554-556 can indicate a specific NAN. In some embodiments, the fourth through sixth octets 554-556 can generally indicate a NAN frame, and a specific NAN can be included in a subsequent field in the frame 500 (FIG. 5) or in, for example, an IE 520.

In some embodiments, the multicast flag 570 (or a groupcast flag) can be set, for example when the A1 field 506 (FIG. 5A) includes the NAN identifier 550. In some embodiments, the multicast flag 570 can be unset (or a unicast flag set), for example when the A3 field 510 (FIG. 5A) includes the NAN identifier 550.

In some embodiments, one or more bits of the fourth through sixth octets 554-556 can indicate a cluster of NAN devices. In some embodiments, one or more bits of the fourth through sixth octets 554-556 can be based on a service application. For example, a NAN created by Application A can include one or more bits of the fourth through sixth octets 554-556 based on an identifier of Application A. For example, the fourth and fifth octets 554-555 can include a hash of an application identifier. In some embodiments, one or more bits of the fourth through sixth octets 554-556 can be based on other contextual information and/or device characteristics such as, for example, a device location, a server-assigned ID, etc. In one example, the sixth octet 556 can include a hash of the latitude and longitude location of the NAN.

Figure 6A:
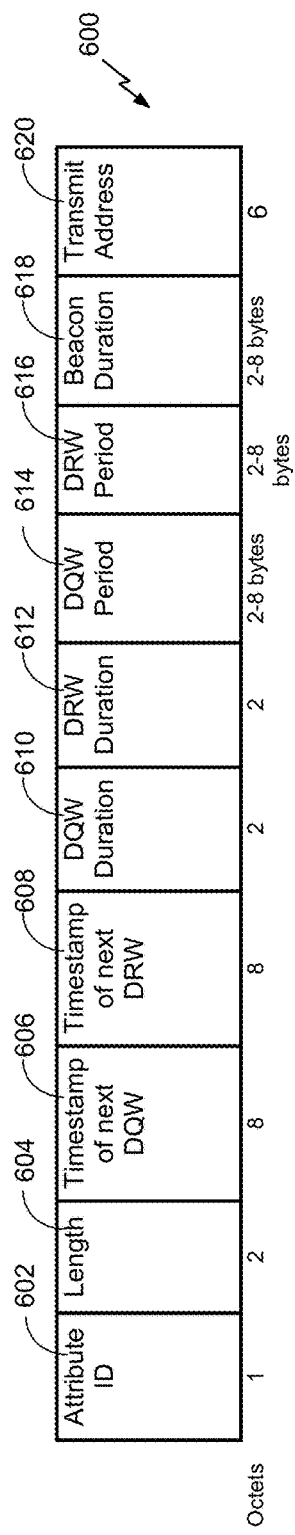
FIG. 6A shows an exemplary attribute of a NAN information element (IE) that can be employed within the NAN of FIG. 3.

FIG. 6A shows an exemplary attribute of a NAN information element (IE) 600 that can be employed within the NAN 320 of FIG. 3. In various embodiments, any device described herein, or another compatible device, can transmit the attribute of the NAN IE 600 such as, for example, the AP 104 (FIG. 3). One or more messages in the wireless NAN 320 can include the attribute of the NAN IE 600 such as, for example, the beacon 410. In some aspects, the NAN information element 600 can be included in MAC header 500 field 520 as described above.

As shown in FIG. 6A, the attribute of the NAN IE 600 includes an attribute ID 602, a length field 604, a Timestamp of a next Discovery Query Window (DQW) field 606, a Timestamp of the next Discovery Query Window (DRW) field 608, a Discovery Query Window (DQW) duration field 610, a Discovery Response Window (DRW) duration field 612, a DQW Period field 614, a DRW Period field 616, a Beacon Window field 618, and a transmit address field 620. A person having ordinary skill in the art will appreciate that the attribute of the NAN IE 600 can include additional fields, and fields can be rearranged, removed, and/or resized.

The attribute identifier field 602 shown is one octet long. In some implementations, the attribute identifier field 602 can be two, five, or twelve octets long. In some implementations, the attribute identifier field 602 can be of variable length, such as varying length from signal to signal and/or as between service providers. The attribute identifier field 602 can include a value which identifies the element as an attribute of the NAN IE 600.

The length field 604 can be used to indicate the length of the attribute of the NAN IE 600 or the total length of subsequent fields. The length field 604 shown in FIG. 6A is two octets long. In some implementations, the length field 604 can be one, five, or twelve octets long. In some implementations, the length field 604 can be of variable length, such as varying length from signal to signal and/or as between service providers.

The Timestamp of next DQW field 606 can indicate a start time of the next discovery query window (for example, the start of the next discovery period 406 described above with respect to FIG. 4). In various embodiments, the start time can be indicated using an absolute timestamp or a relative timestamp. The Timestamp of next DQR field 608 can indicate a start time of the next discovery query response (for example, the start of the next discovery query response period described below with respect to FIGS. 7-9). In various embodiments, the start time can be indicated using an absolute timestamp or a relative timestamp.

The DQW duration field 610 can indicate a duration of the DQW (for example, the duration of the DQW described below with respect to FIG. 7-9). In various embodiments, the DQW duration field 610 can indicate the duration of the DQW in ms, μs, time units (TUs), or another unit. In some embodiments, time units can be 1024 μs. The DQW duration field 610 shown is two octets long. In some implementations, DQW duration field 610 can be four, six, or eight octets long.

The DRW duration field 612 can indicate a duration of the DRW (for example, the duration of the DRW described below with respect to FIG. 7-9). In various embodiments, the DRW duration field 612 can indicate the duration of the DRW in ms, μs, time units (TUs), or another unit. In some embodiments, time units can be 1024 μs. The DRW duration field 612 shown is two octets long. In some implementations, DRW duration field 612 can be four, six, or eight octets long.

In some embodiments, the DQW period field 614 can indicate a length of the DQW (described below with respect to FIGS. 7-9). In various embodiments, the DQW period field 614 can indicate the length of the DQW in ms, μs, time units (TUs), or another unit. In some embodiments, time units can be 1024 μs. The DQW period field 614 shown is between two and eight octets long. In some implementations, the DQW period field 614 can be two, four, six, or eight octets long.

In some embodiments, the DRW period field 616 can indicate a length of the DRW (described below with respect to FIGS. 7-9). In various embodiments, the DRW period field 616 can indicate the length of the DRW in ms, μs, time units (TUs), or another unit. In some embodiments, time units can be 1024 μs. The DRW period field 616 shown is between two and eight octets long. In some implementations, the DRW period field 616 can be two, four, six, or eight octets long.

The Beacon Duration field 618 can indicate a duration of a Beacon Window (for example, the duration of the Beacon Window described below with respect to FIGS. 7-9). In various embodiments, the Beacon Duration field 618 can indicate the duration of the Beacon Window in ms, μs, time units (TUs), or another unit. In some embodiments, time units can be 1024 μs. The Beacon Window field 618 shown is between two and eight octets long. In some implementations, Beacon Window field 618 can be four, six, or eight octets long.

The Transmit Address field 620 indicates a network address of a node transmitting the NAN IE 600. In some aspects, the A3 field 510 of the MAC header 500 discussed above with respect to FIG. 5A can be set to a NAN BSSID and/or a NAN identifier. Therefore, the NAN IE 600 can provide the transmitter address field 620 to enable receivers to determine the network address of the transmitter. In some embodiments, the A1 field 506 discussed above with respect to FIG. 5A can be set to a NAN BSSID and/or a NAN identifier. Therefore, the NAN IE 600 can provide a receiver address field 620 to enable receivers to determine the network address of the target receiver. In some embodiments, the NAN IE 600 can further include the NAN BSSID and/or a NAN identifier.

Figure 6B:
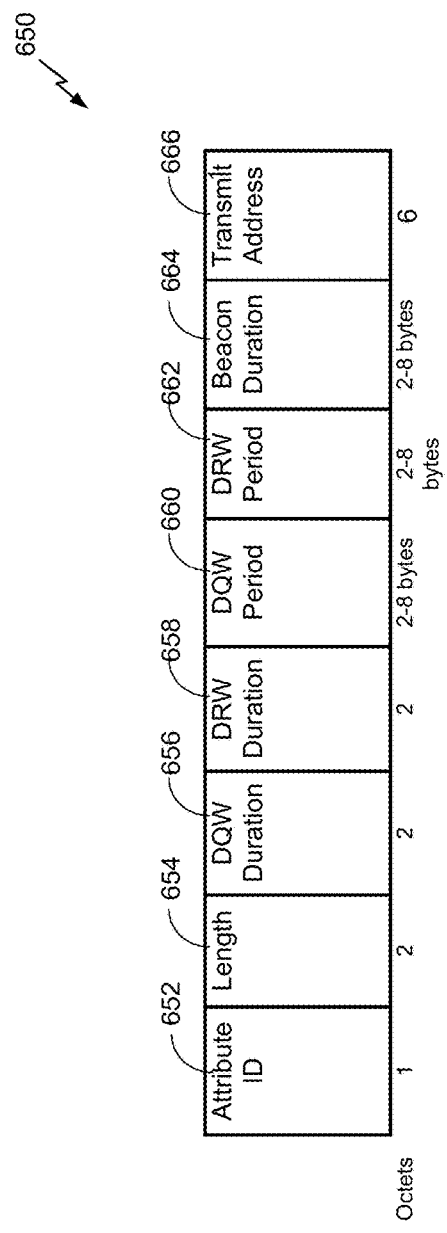
FIG. 6B shows another exemplary attribute of a NAN information element (IE) that can be employed within the NAN of FIG. 3.

FIG. 6B shows another exemplary attribute of a NAN information element (IE) 650 that can be employed within the NAN 320 of FIG. 3. In various embodiments, any device described herein, or another compatible device, can transmit the attribute of the NAN IE 650 such as, for example, the AP 104 (FIG. 3). One or more messages in the wireless NAN 320 can include the attribute of the NAN IE 650 such as, for example, the beacon 410. In some aspects, the NAN information element 650 can be included in MAC header 500 field 520 as described above.

NAN information element 650 differs from NAN information element 600 in that the discovery query window timestamp and the discovery query response window timestamp have been removed from NAN information element 650 relative to NAN information element 600. In some aspects, a receiver of NAN information element 650 can determine a discovery query window start time as the time when a local clock reference that is synchronized to a NAN clock reference is evenly divided by the DQW period field 660 (Station Clock mod DQW period=0). Similarly, the discovery response window start time can be determined in some aspects based on when a local clock synchronized to a NAN clock reference is evenly divided by the DRW period field 662 (Station Clock mod DRW period=0). Note that these example methods of determining a discovery query window or discovery response window start time are similar to the method used to determine a beacon window start time, which can be found in some aspects as Station Clock mod Beacon Interval=0).

Figure 7:
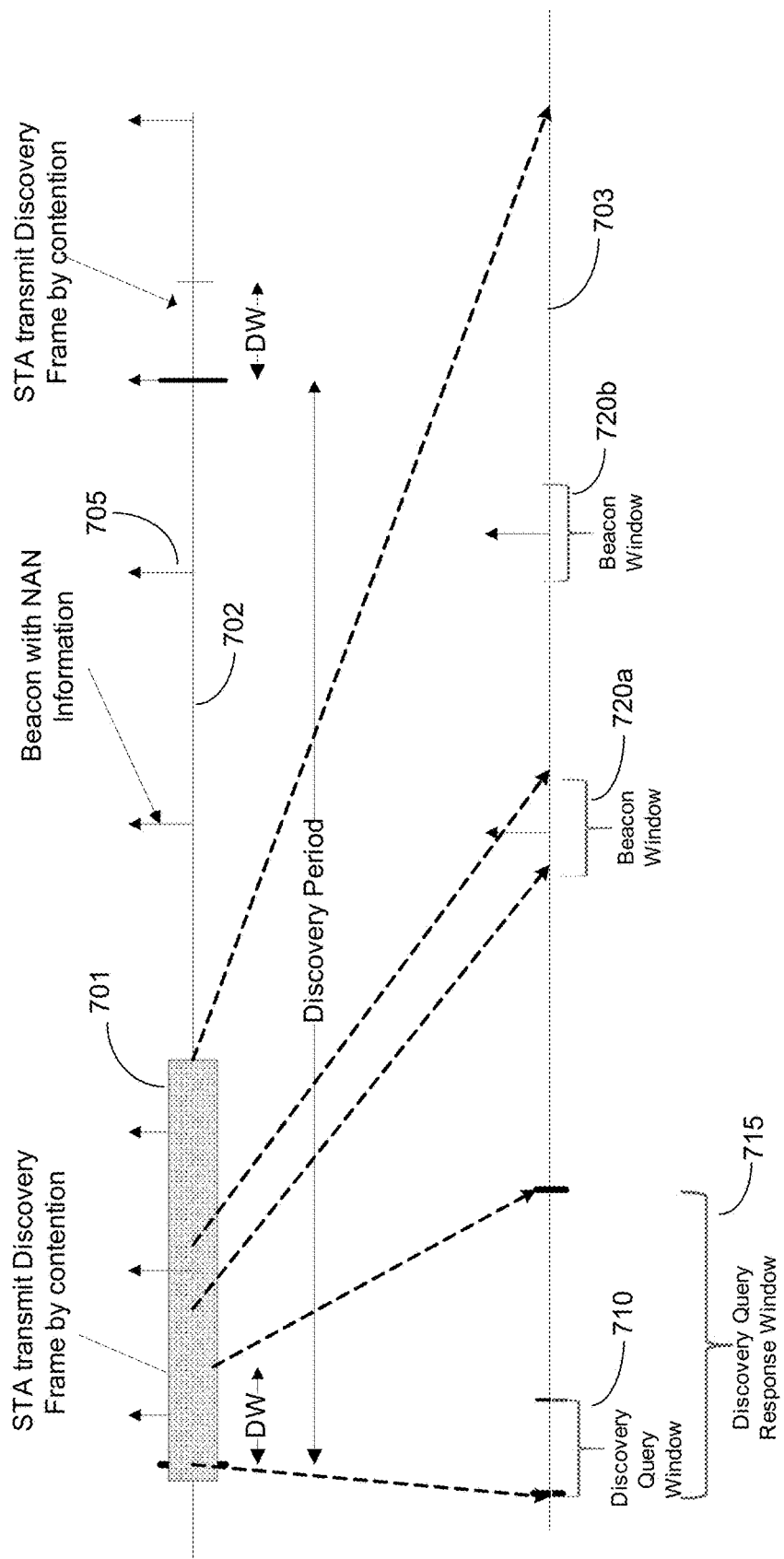
FIG. 7 is a timing diagram illustrating one embodiment of a beacon window, discovery query window, and discovery query response window.

FIG. 7 is a timing diagram illustrating one embodiment of a beacon window, discovery query window, and discovery query response window. A portion 701 of the timeline 702 is expanded as the lower timeline 703. Timeline 702 shows a series of beacon signals 705. Shown on the expanded timeline 703 are a discovery window 710 and a discovery query response window 715. Expanded timeline 703 also shows that one or more beacon windows 720a-b can occur within the discovery period. In an embodiment, sync frames can be transmitted during the beacon window. In some embodiments, sync frames can be transmitted at a specific target beacon transmission time (TBTT) within the beacon window. In the illustrated embodiment, the discovery query window 710 is completely within the discovery query response window 715.

Figure 8:
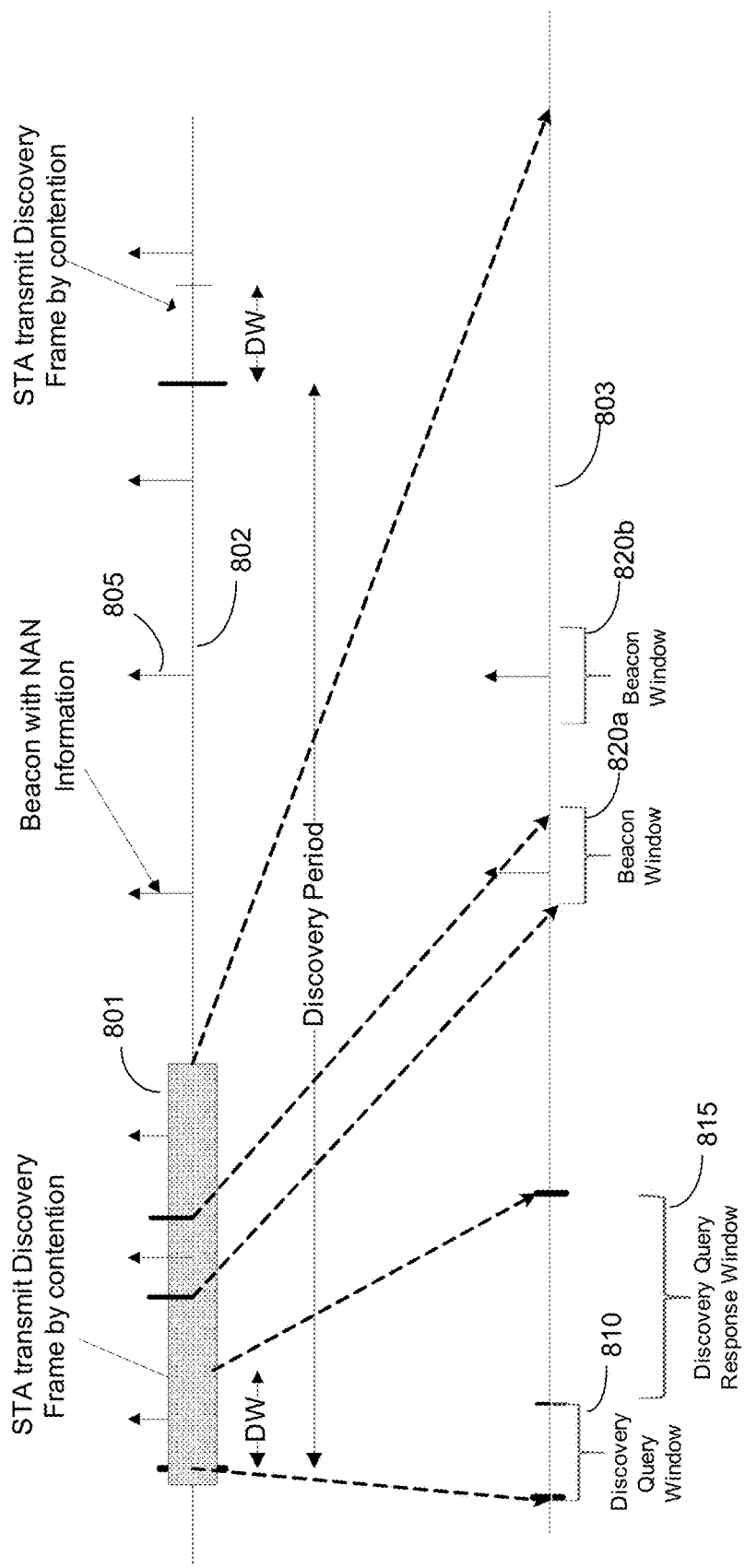
FIG. 8 is a timing diagram illustrating one embodiment of a beacon window, discovery query window, and discovery query response window.

FIG. 8 is a timing diagram illustrating one embodiment of a beacon window, discovery query window, and discovery query response window. A portion 801 of the timeline 802 is expanded as the lower timeline 803. Timeline 802 shows a series of beacon signals 805. Shown on the expanded timeline 803 are a discovery window 810 and a discovery query response window 815. Expanded timeline 803 also shows that one or more beacon windows 820a-b can occur within the discovery period. In the illustrated embodiment of FIG. 8, the discovery query window 810 does not overlap the discovery query response window 815. Instead, the discovery query response window 815 immediately follows the end of the discovery query window 810.

Figure 9:
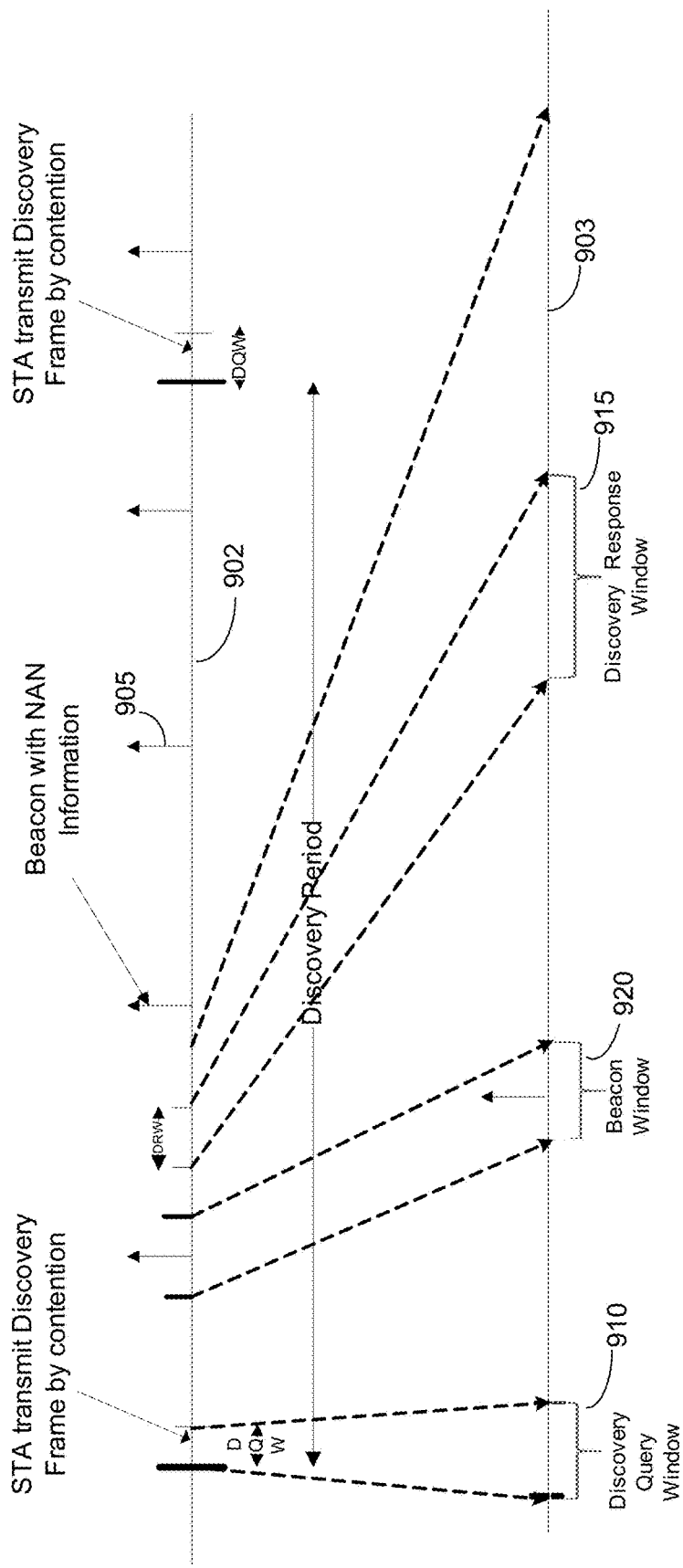
FIG. 9 is a timing diagram illustrating one embodiment of a beacon window, discovery query window, and discovery query response window.

FIG. 9 is a timing diagram illustrating one embodiment of a beacon window, discovery query window, and discovery query response window. A portion of timeline 902 is expanded as the lower timeline 903. Timeline 902 shows a series of beacon signals 905. Shown on the expanded timeline 903 are a discovery window 910 and a discovery query response window 915. Expanded timeline 903 also shows that one or more beacon windows 920 can occur within the discovery period. In the illustrated embodiment of FIG. 9, the timing of the discovery query window 910 is unrelated to the timing of the discovery query response window 915.

Certain aspects described herein are directed to devices and methods for synchronization of clock signals of STAs operating in a peer-to-peer fashion. In aspect, at least some of the STAs may transmit the current time value of their clock signals to the other STAs. For example, in accordance with certain embodiments, STAs may periodically transmit a "sync" frame that carries a time stamp. The current time value may correspond to a time-stamp value. For example, in one embodiment, a discovery message as described above may serve as the 'sync' frame and carry a current time value of a STA 106. In addition to the time stamp, the sync frame may also include information regarding the discovery interval and discovery period. For example, the sync frame may include the schedule of the discovery interval and discovery period. Upon receipt of a sync frame, a STA 106 that may be new to the network may determine the time and the discovery interval/discovery period schedule in the network. STAs already communicating within the network may maintain synchronization while overcoming clock drift as described below. Based on the sync message, STAs may enter and exit a network (e.g., a NAN) without losing synchronization. Furthermore, the synchronization messages described herein may allow for avoiding excessive power drain and the STAs in the network may share the burden of messaging for synchronization. Furthermore, certain embodiments allow for a low messaging overhead (e.g., as only a few devices may send sync frames in every discovery period as will be described below). As described above with reference to FIG. 4, for example, discovery packets within a NAN are transmitted during a discovery interval 402 that occurs every discovery period 406. As such, sync messages may be sent during a discovery interval 402 for certain discovery periods.

Figure 10:
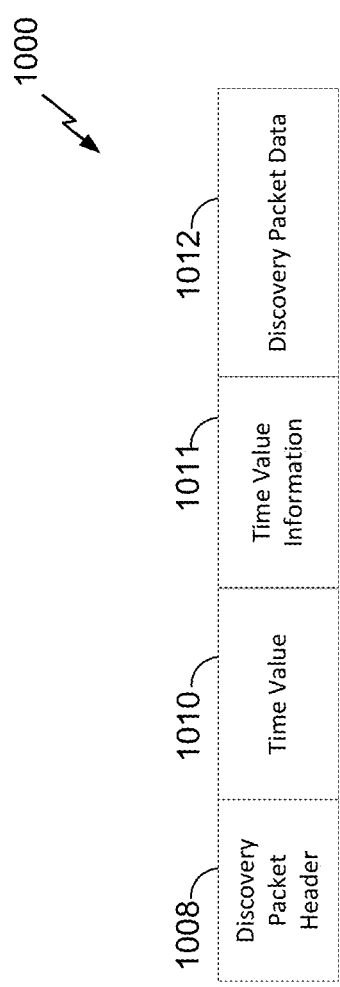
FIG. 10 illustrates a message that can include a time value for synchronization.

FIG. 10 illustrates a message 1000 that can include a time value for synchronization. As described above, in some embodiments, the message 1000 can correspond to a discovery message. The message 1000 can include a discovery packet header 1008. The message can further include 1010 a time value for synchronization 1010. In some embodiments, the discovery packet header 1008 can include the time value 1010. The time value can correspond to a current time value of a clock signal of a STA 106 transmitting the message 1000. In addition the message 1000 can include time value information 1011 that can relate to the accuracy of the time value or how it might be used in synchronization. In an embodiment, the time value information 1011 can include the MPN of the STA 106. The message 1000 can further include discovery packet data 1012. While FIG. 10 shows discovery message serving as the sync message, it should be appreciated that according to other embodiments, the sync message can be sent apart from the discovery message. Moreover, a person having ordinary skill in the art will appreciate that the various fields described herein can be rearranged, resized, some fields can be omitted, and additional fields can be added.

It should be appreciated that a STA 106 may not transmit a sync frame every discovery interval. Rather, a probability value (P_sync), as is further described below, may be used to determine whether the STA 106 transmits and/or prepares a sync frame. As such, while in some embodiments, at least some sync frames are sent for every discovery interval, in certain embodiments, not all the STAs participating in the NAN transmit a sync frame for every discovery interval. Probabilistic frame preparation and/or transmission can allow for reduced power consumption in transmitting sync frames while still enabling synchronization.

Figure 11:
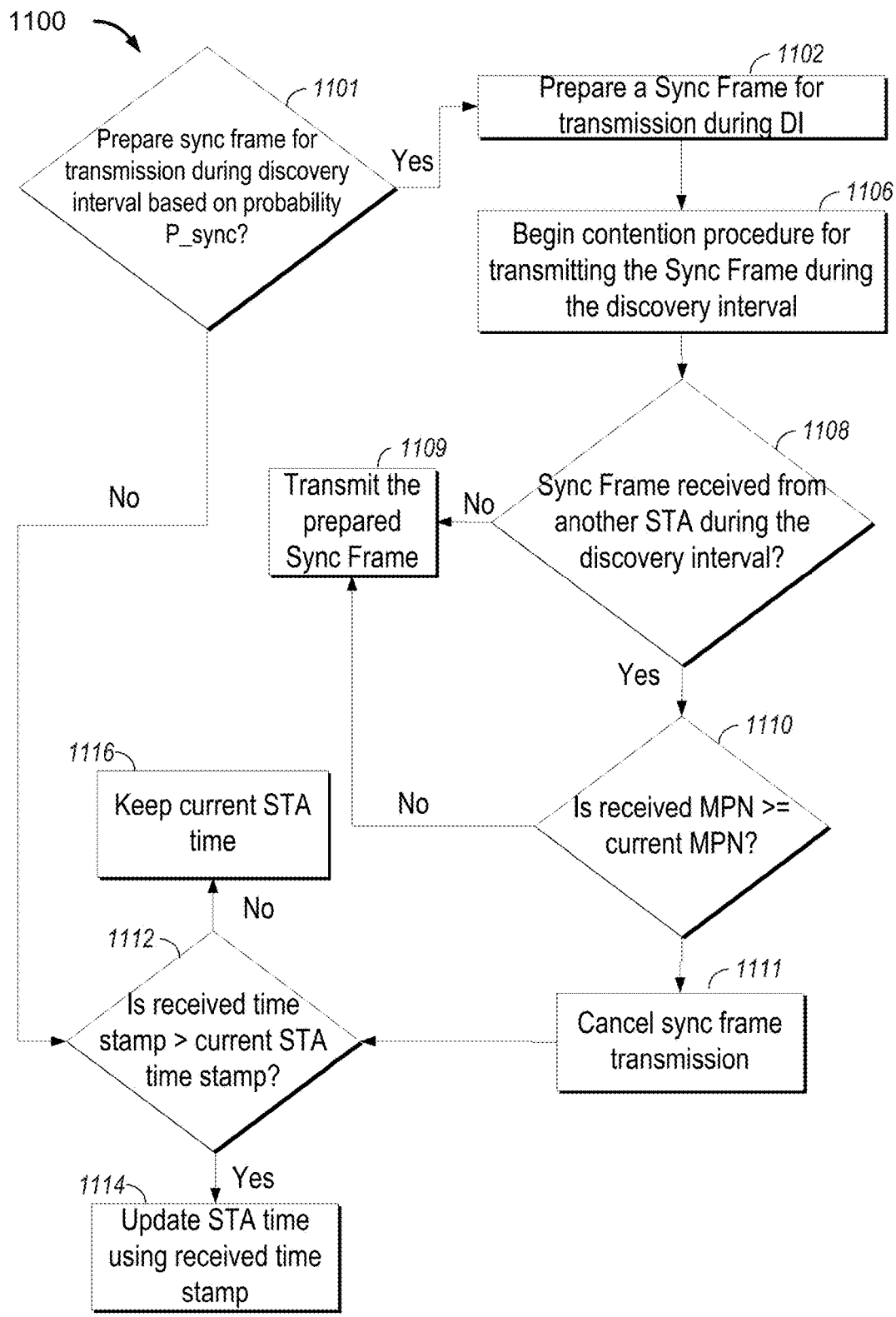
FIG. 11 shows a flowchart of a method of transmitting and receiving a synchronization frame in accordance with an embodiment.

FIG. 11 shows a flowchart 1100 of a method of transmitting and receiving a synchronization frame in accordance with an embodiment. The method can be implemented in whole or in part by the devices described herein, such as the wireless device 202 shown in FIG. 2 of any of the STAs 106a-106i shown in FIGS. 1A-1B. Although the illustrated method is described herein with reference to the wireless communication systems 100 and 160 discussed above with respect to FIGS. 1A-1B, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

In one aspect, at block 1101, the device 202 determines whether a sync frame is to be prepared for transmission for the discovery interval using a probability value P_sync. Stated another way, the device 202 may determine whether to prepare a sync frame for transmission based on a probability value. Alternatively, the device 202 can determine whether to cancel or transmit a prepared sync frame using the probability value P_sync. Accordingly, sync frames are only sent by a certain number of nodes within a NAN for any one discovery period.

For example, in some cases the probability value may be on the order of 1 such that the device 202 prepares the sync frame for transmission for every discovery period. Alternatively, according to another embodiment, the probability may be on the order of, for example, 0.3 such that the device 202 only prepares a sync frame for transmission during a discovery interval approximately every third discovery period. In an embodiment, each STA 106 can choose a pseudo-random number for comparison with P_sync, such that different STAs prepare sync frames for transmission during different discovery periods. In this way, sync frames are likely to be transmitted in all discovery periods but not by all STAs.

In an embodiment, the value of P_sync may be adapted during operation. For example, the value of P_sync may be adapted according to the number of STAs in the network, and/or the number of STAs detected by the device 202. For example, the value of P_sync can be reduced as the number of STAs in the neighborhood of the transmitting device 202 increases. In one embodiment, the device 202 can choose P_sync based on a number of devices N according to Equations 1-3, below.

$$\text{erfc}\left\{\frac{M1 - N \cdot p1}{\sqrt{2N(p1)(1-p1)}}\right\} > T1 \quad (1)$$

$$\text{erfc}\left\{\frac{M2 - N \cdot p2}{\sqrt{2N(p2)(1-p2)}}\right\} < T2 \quad (2)$$

$$\text{P\_sync} = \max(p1, p2) \quad (3)$$

As shown in Equations 1-3, above, the device 202 can choose P_sync such that the number of devices that contend is greater than a target minimum number of contending devices M1 with a threshold probability T1. In various embodiments, M1 can be between around 1 and around 10, such as, for example, 1. In some embodiments, M1 can be determined as a percentage of N such as, for example, 1%, 5%, or 10%. In various embodiments, T1 can be between around 0.9 and around 0.999, such as, for example, 0.9. Thus, the device 202 can determine the lowest p1 that satisfies Equation 1, where erfc is the complementary error function.

Similarly, the device 202 can choose P_sync such that the number of devices that contend is less than a target maximum number of contending devices M2 with a threshold probability T2. In various embodiments, M2 can be between around 50 and around 100, such as, for example, 75. In some embodiments, M2 can be determined as a percentage of N such as, for example, 10%, 15%, or 20%. In various embodiments, T1 can be between around 0.01 and around 0.2, such as, for example, 0.1. Thus, the device 202 can determine the highest p2 that satisfies Equation 2, where erfc is the complementary error function.

As shown in Equation 3, the device 202 can choose P_sync as the maximum of p1 and p2. In some embodiments, the device 202 can choose P_sync as the minimum of p1 and p2. In various other embodiments, the device 202 can choose P_sync as another value between p1 and p2 such as, for example, the average of p1 and p2, or more generally the sum of p1 and p2 times a fraction.

If the device 202 determines at block 1101 to prepare a sync frame based on the probability P_sync, then at block 1102, a sync frame is prepared for transmission. If the device 202 determines at block 1101 not to prepare the sync frame, then the device 202 can listen for time values from other STAs and update its own time value based on received time values as necessary to be synchronized (for example, at block 1112).

As discussed above, at block 1102, the device 202 prepares a sync frame for transmission. The sync frame can include a time stamp of the device 202 as described above, for example with respect to FIG. 10. In addition, the sync frame can include a network identifier that identifiers the NAN or "social Wi-Fi" network in which the device 202 is participating within. The identifier can be randomly generated when the network is first established between the STAs and can remain during the lifetime of the network. A device 202 receiving a sync frame with a network identifier may only perform an update of a time value based on a received time value if the network identifier received matches the network identifier of the network that the device 202 is currently participating within.

In some embodiments, a plurality of nodes, or every node, in a NAN can each prepare a sync frame. In some embodiments, a subset of the devices in the NAN can prepare a sync frame. In some embodiments, the number of devices in the subset of devices can be based on the number of devices in the NAN. For example, the device 202 can prepare the sync frame using a probability value P_sync, as described above. In some embodiments, the device 202 can determine its contention parameters based on its MPN. For example, nodes having a higher MPN can attempt to transmit the sync frame during an earlier (or lower) contention slot (or window).

Next, at block 1106, the device 202 can begin a contention procedure for transmitting the sync frame during the discovery interval. In an embodiment, the device 202 can use contention parameters based on its MPN. However, in some cases before the contention procedures allows for the device 202 to transmit the sync frame, a sync frame can be received from another STA (e.g., STA 106*b*) during the discovery interval. As such, at decision block 1108, it is determined whether a sync frame is received from another STA 106*b* during the discovery interval. If by decision block 1108, a sync frame is not received from another STA 106*b* during the discovery interval, at block 1109, the prepared sync frame is transmitted by the device 202.

If a sync frame was received from another STA 106*b*, then at block 1110, the device 202 determines whether the MPN of the device transmitting the sync frame is greater than or equal to the MPN of the device 202. For example, the device 202 can determine the MPN of the STA 106*b* from a capability field transmitted by the STA 106*b*. If the received MPN is greater than or equal to the current MPN of the device 202, the device 202 cancels transmission of the sync frame at block 1111. If the received MPN is less than the current MPN of the device 202, the device 202 proceeds to transmit the prepared sync frame at block 1109, at the next available time according to contention parameters. A person having ordinary skill in the art will appreciate that alternative MPN schemes can be used. In one embodiment, for example, lower MPNs can have greater preference for sync frame transmission.

At block 1111, if it is determined at block 1108 to cancel sync frame transmission, then the device 202 can listen for time values from other STAs and update its own time value based on received time values as necessary to be synchronized. For example, the received time stamp from STA 106*b* can then be used to potentially update the time of the device 202 according to one or more criteria as described in the embodiments below.

For example, at block 1112, the device 202 determines if the received time stamp is greater than a current time of the device 202. If, the received timestamp is greater than the current time stamp of the device 202, the device 202 adopts the received time stamp for use in determining when to transmit and receive as shown in block 1114. Otherwise, the current time stamp of the device 202 is not adopted at block 1116. In another embodiment, the device 202 can update its time value to the maximum of all received time stamps, all received time stamps sent by a STA having a higher MPN, or otherwise provided by any device or a combination of the embodiments described herein. The timestamp of the device 202 may not count in determining the maximum. This can ensure that a device 202 that has a faster drift and has not transmitted its sync frame keeps its clock in sync.

In an embodiment, the criteria for updating a current time value of a device 202 based on received time value from another STA 106*b* can further depend on the received signal strength indication (RSSI) of the device 202. For example, based on the RSSI of the device 202, even where a device 202 receives a sync frame, it can nonetheless proceed with transmitting a sync frame it has prepared. In another embodiment, the criteria for updating the current time value of the device 202 can be based on whether the received time is a threshold amount greater than the current device time. In an embodiment, the threshold can be based on a maximum allowed clock drift network parameter.

Figure 12:
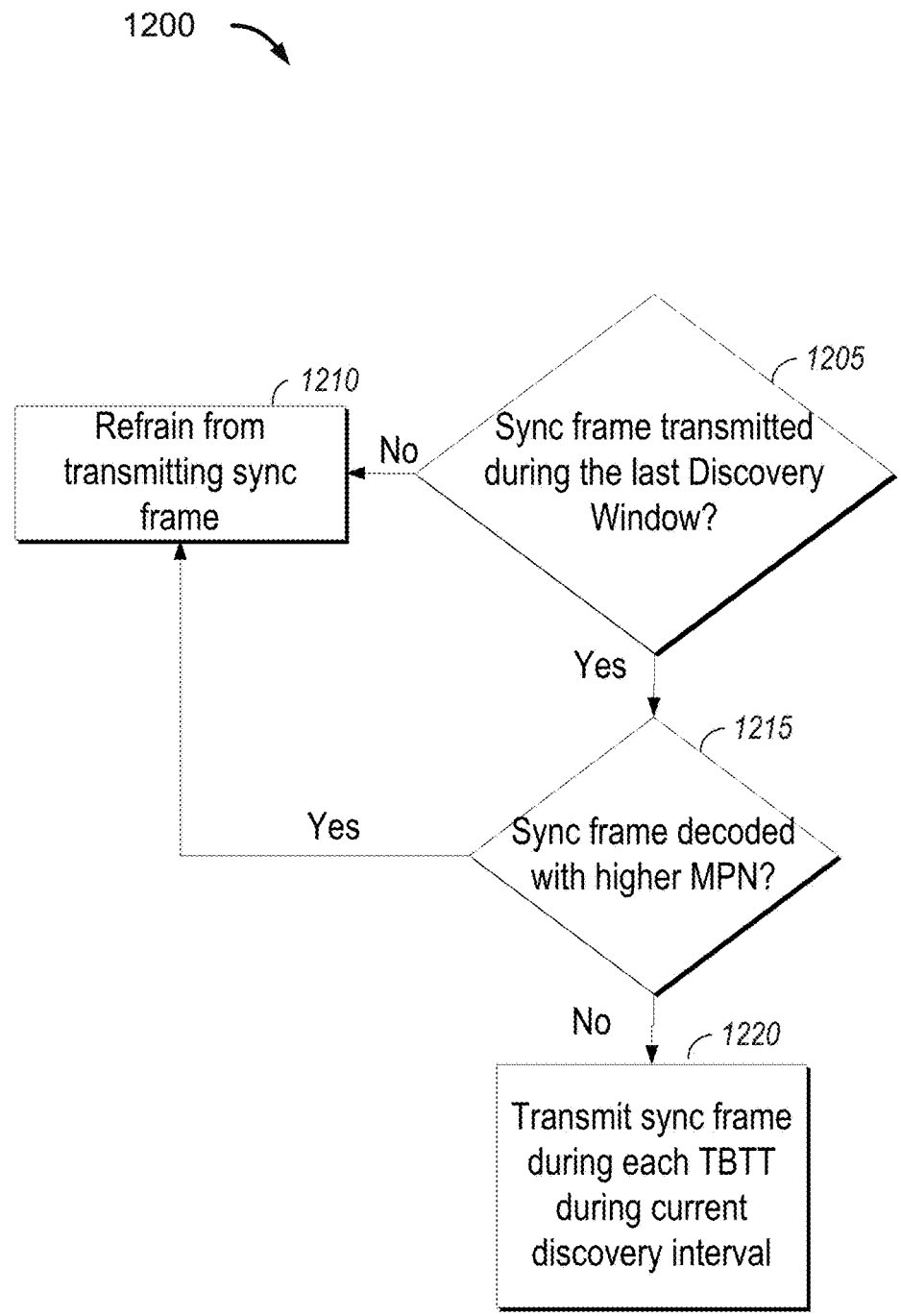
FIG. 12 shows a flowchart of a method of transmitting a synchronization frame in accordance with an embodiment.

FIG. 12 shows a flowchart 1200 of a method of transmitting a synchronization frame in accordance with an embodiment. In some embodiments, the method can coordinate transmission of sync frames during TBTTs and/or beacon windows between discovery windows. The method can be implemented in whole or in part by the devices described herein, such as the wireless device 202 shown in FIG. 2 of any of the STAs 106*a*-106*i* shown in FIGS. 1A-1B. Although the illustrated method is described herein with reference to the wireless communication systems 100 and 160 discussed above with respect to FIGS. 1A-1B, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1202, the device 202 determines whether it successfully transmitted a sync frame during the last discovery window. For example, the device 202 can determine whether it transmitted the prepared sync frame at block 1109 of FIG. 11. If the device 202 did not transmit a sync frame during the last discovery window, it can act as a non-master node. Accordingly, the device 202 can refrain from transmitting additional sync frames at block 1210.

In an embodiment, at block 1210, the device 202 can refrain from transmitting additional sync frames for the duration of the current discovery interval. In other words, the device 202 can refrain from transmitting additional sync frames until at least the next discovery window, during which the device 202 can re-initiate the contention process described in the flowchart 1100 of FIG. 11. In some embodiments, the device 202 can particularly refrain from transmitting additional sync frames during TBTTs and/or beacon windows between discovery windows.

Next, at block 1215, when the device 202 has transmitted a sync frame during the last discovery window, the device 202 determines whether it has received and/or decoded another sync frame from a device having a higher MPN. If the device 202 has received a sync frame having a higher MPN during the current discovery interval, the device can act as a non-master node. For example, the MPN can be included in a capability field of the received sync frame. Accordingly, the device 202 can refrain from transmitting additional sync frames at block 1210.

Then, at block 1220, when the device 202 has not received a sync frame from a device with a higher MPN, the device 202 can act as a master node at block 1220. Accordingly, the device 202 can transmit a sync frame during one or more TBTTs and/or beacon windows in the current discovery interval. In some embodiments, the device 202 can transmit a sync frame during every TBTT and/or beacon window until at least the next discovery window. During the next discovery window, the device 202 can re-initiate the contention process described in the flowchart 1100 of FIG. 11. Accordingly, master nodes can be determined more fairly because they can have an opportunity to change at each discovery window.

In some embodiments, the device 202 can continue to monitor transmission of sync frames, for example at each subsequent TBTT and/or beacon window. If the device 202 sees another sync frame associated with a higher MPN, the device 202 can recharacterize as a non-master node. Accordingly, the device 202 can refrain from transmitting additional sync frames at block 1210.

Figure 13:
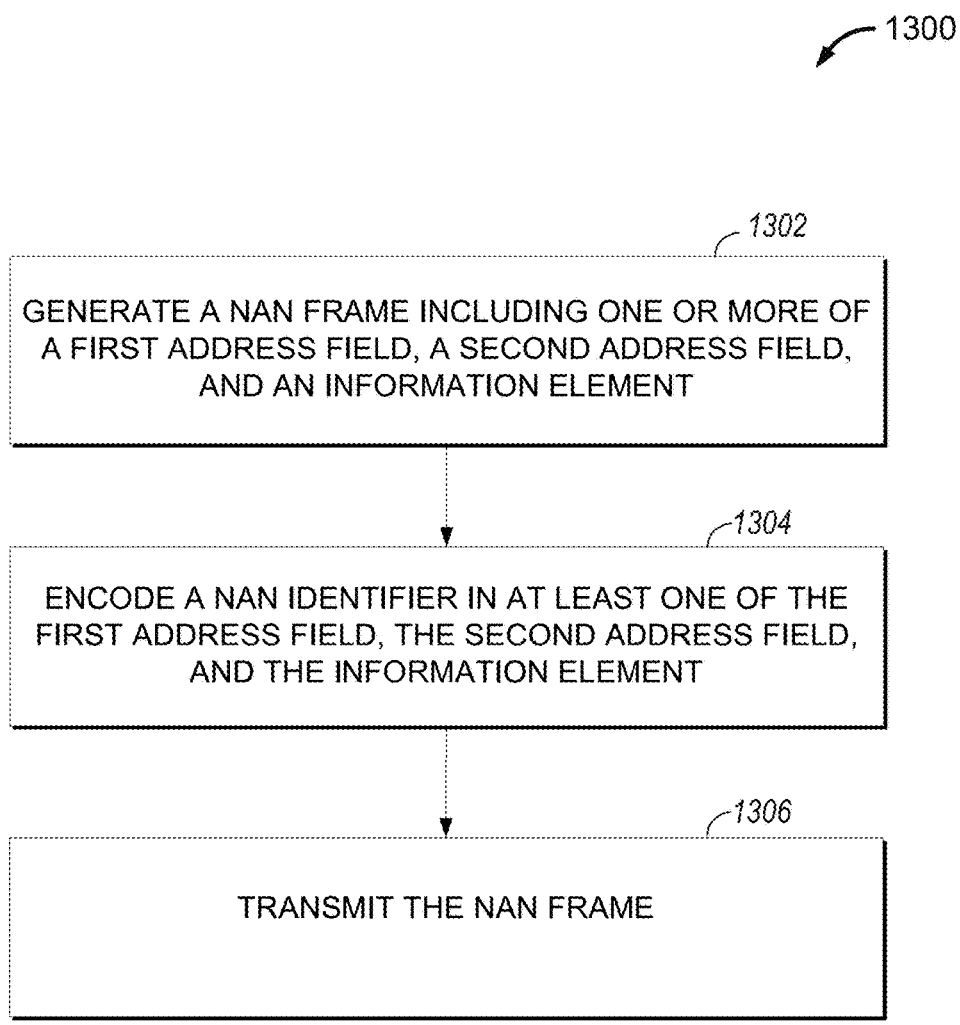
FIG. 13 shows a flowchart for an exemplary method of wireless communication that can be employed within the wireless communication system 100 of FIG. 1.

FIG. 13 shows a flowchart 1300 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the wireless device 202 discussed above with respect to FIG. 2, and the NAN frame 500 discussed above with respect to FIG. 5A, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1302, the device 202 generates a NAN frame including one or more of a first address field, a second address field, a third address field, and an information element. For example, the processor 204 can generate the NAN frame 500 including the A1 field 506, the A3 field 510, and/or the NAN IE 520. In various embodiments, the first address field can include any of an A1 field, an A2 field, an A3 field, a receiver address field, a transmitter address field, a destination address field, etc. In various embodiments, the second address field can include any of an A1 field, an A2 field, an A3 field, a receiver address field, a transmitter address field, a destination address field, etc. In an embodiment, the third address field can include a basic service set identifier (BSSID) field.

Next, at block 1304, the device 202 encodes a NAN identifier in at least one of the first address field, the third address field, and the information element. For example, the processor 204 can encode the NAN identifier 550, described above with respect to FIG. 5B, in the A1 field 506, the A3 field 510, and/or the NAN IE 520. In an embodiment, the NAN identifier can include an organizationally unique identifier (OUI) indicative of a NAN frame. For example, the NAN identifier 550 can include the OUI 560 (FIG. 5B).

In various embodiments, the NAN frame can include a synchronization beacon or discovery frame. The first address field can include a cluster identifier having a group-cast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the NAN identifier can further include one or more bits including a hash of an application identifier. For example, the fourth and fifth octets 554-555 (FIG. 5B) can include a hash of an application identifier. In various embodiments, the NAN identifier can further include a least-significant octet indicative of a specific NAN. For example, the sixth octet 556 (FIG. 5B) can include a value indicating a specific NAN.

In various embodiments, the NAN identifier can further include a least-significant octet indicative of a wildcard NAN. For example, the sixth octet 556 (FIG. 5B) can indicate a wildcard NAN when set to a reserved value such as 0xFF. In various embodiments, the NAN identifier can further include a secondary identifier indicative of a NAN frame, and the NAN frame can further include a subsequent field indicative of a specific NAN.

Then, at block 1306, the device 202 transmits the NAN frame. For example, the transmitter 214 can transmit the NAN frame 500. In some embodiments, the device 202 can further set a multicast flag of the NAN identifier when the NAN identifier is encoded in the receiver address field. The device 202 can further unset the multicast flag when the NAN identifier is encoded in the destination address field.

In some embodiments, the device 202 can further identify one or more NAN characteristics. The device 202 can further encode the one or more NAN characteristics in the NAN identifier. In various embodiments, the one or more NAN characteristics include one or more of: an identifier that the NAN frame is a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

In an embodiment, the method shown in FIG. 13 can be implemented in a wireless device that can include a generating circuit, an encoding circuit, and a transmitting circuit. Those skilled in the art will appreciate that a wireless device can have more components than the simplified wireless device described herein. The wireless device described herein includes only those components useful for describing some prominent features of implementations within the scope of the claims.

The generating circuit can be configured to generate the NAN frame. The generating circuit can be configured to perform at least block 1302 of FIG. 13. The generating circuit can include one or more of the processor 204 (FIG. 2), and the memory 206 (FIG. 2). In some implementations, means for generating can include the generating circuit.

The encoding circuit can be configured to encode the NAN identifier in the NAN frame. The encoding circuit can be configured to perform at least block 1304 of FIG. 13. The encoding circuit can include one or more of the processor 204 (FIG. 2), and the memory 206 (FIG. 2). In some implementations, means for encoding can include the encoding circuit.

The transmitting circuit can be configured to transmit the NAN frame. The transmitting circuit can be configured to perform at least block 1306 of FIG. 13. The transmitting circuit can include one or more of the transmitter 210 (FIG. 2), the antenna 216 (FIG. 2), and the transceiver 214 (FIG. 2). In some implementations, means for transmitting can include the transmitting circuit.

Figure 14:
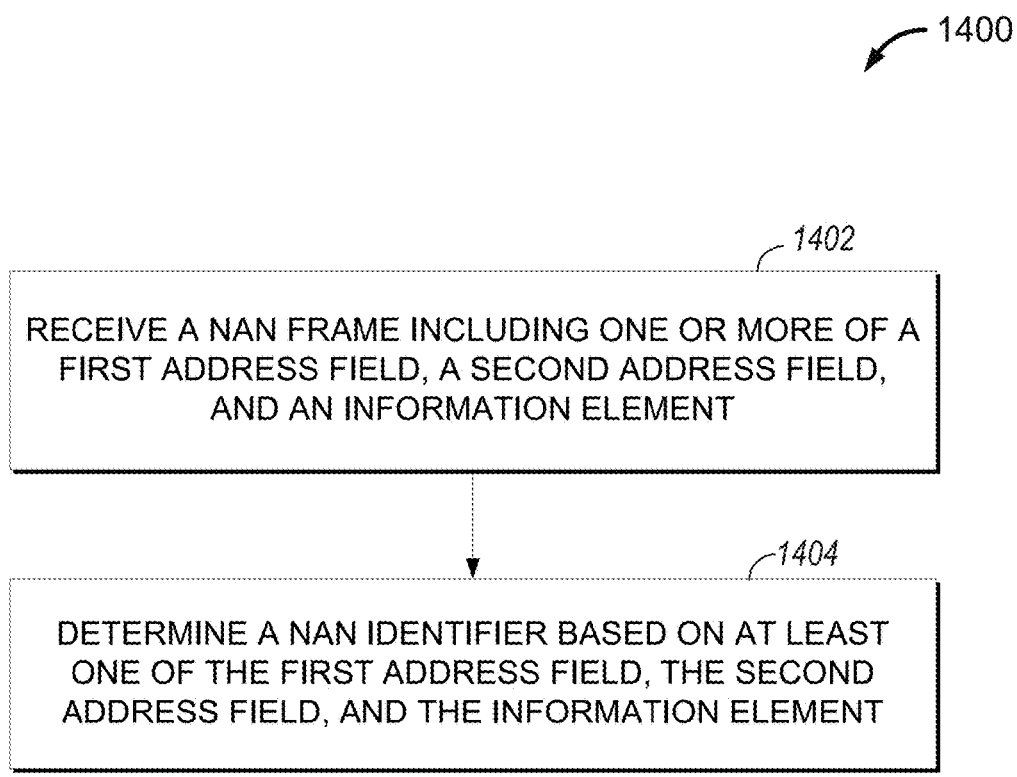
FIG. 14 shows a flowchart for another exemplary method of wireless communication that can be employed within the wireless communication system 100 of FIG. 1.

FIG. 14 shows a flowchart 1400 for another exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the wireless device 202 discussed above with respect to FIG. 2, and the NAN frame 500 discussed above with respect to FIG. 5A, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1402, the device 202 receives a NAN frame including one or more of a receiver address field, a destination address field, and an information element. For example, the receiver 212 can receive the NAN frame 500 including the A1 field 506, the A3 field 510, and/or the NAN IE 520. In various embodiments, the first address field can include any of an A1 field, an A2 field, an A3 field, a receiver address field, a transmitter address field, a destination address field, etc. In various embodiments, the second address field can include any of an A1 field, an A2 field, an A3 field, a receiver address field, a transmitter address field, a destination address field, etc. In an embodiment, the third address field can include a basic service set identifier (BSSID) field.

Next, at block 1404, the device 202 determines a NAN identifier based on at least one of the receiver address field, the destination address field, and the information element. For example, the processor 204 can determine the NAN identifier 550, described above with respect to FIG. 5B, based on the A1 field 506, the A3 field 510, and/or the NAN IE 520. In an embodiment, the NAN identifier can include an organizationally unique identifier (OUI) indicative of a NAN frame. For example, the NAN identifier 550 can include the OUI 560 (FIG. 5B).

In various embodiments, the NAN frame can include a synchronization beacon or discovery frame. The first address field can include a cluster identifier having a groupcast indication. The second address field can include a source address. The third address field can include a value indicating that the frame is a NAN frame.

In various embodiments, the NAN frame can include a synchronization beacon or discovery frame. The first address field can include a value indicating that the frame is a NAN frame. The second address field can include a source address. The third address field can include a cluster identifier.

In various embodiments, the NAN frame can include a multicast discovery frame. The first address field can include a cluster identifier having a group-cast indication. The second address field can include a source address. The third address field can include a value indicating that the frame is a NAN frame.

In various embodiments, the NAN frame can include a multicast discovery frame. The first address field can include a value indicating that the frame is a NAN frame. The second address field can include a source address. The third address field can include a cluster identifier.

In various embodiments, the NAN frame can include a unicast discovery frame. The first address field can include a destination address. The second address field can include a source address. The third address field can include cluster identifier having a unicast indication. In various embodiments, the value indicating that the frame is a NAN frame can include a value of 0xFF appended to an organizationally unique identifier (OUI) indicative of a NAN frame.

In various embodiments, the NAN identifier can further include one or more bits including a hash of an application identifier. For example, the fourth and fifth octets 554-555 (FIG. 5B) can include a hash of an application identifier. In various embodiments, the NAN identifier can further include a least-significant octet indicative of a specific NAN. For example, the sixth octet 556 (FIG. 5B) can include a value indicating a specific NAN.

In various embodiments, the NAN identifier can further include a least-significant octet indicative of a wildcard NAN. For example, the sixth octet 556 (FIG. 5B) can indicate a wildcard NAN when set to a reserved value such as 0xFF. In various embodiments, the NAN identifier can further include a secondary identifier indicative of a NAN frame, and the NAN frame can further include a subsequent field indicative of a specific NAN.

In some embodiments, the device 202 can further decode a set multicast flag of the NAN identifier when the NAN identifier is encoded in the receiver address field. The device 202 can further decode an unset multicast flag when the NAN identifier is encoded in the destination address field.

In some embodiments, the device 202 can further decode one or more NAN characteristics. The device 202 can further apply the one or more NAN characteristics in the NAN identifier. In various embodiments, the one or more NAN characteristics include one or more of: an identifier that the NAN frame is a NAN frame, a device cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

In an embodiment, the method shown in FIG. 14 can be implemented in a wireless device that can include a receiving circuit and a determining circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the NAN frame. The receiving circuit can be configured to perform at least block 1402 of FIG. 14. The receiving circuit can include one or more of the receiver 212 (FIG. 2), the antenna 216 (FIG. 2), and the transceiver 214 (FIG. 2). In some implementations, means for receiving can include the receiving circuit.

The determining circuit can be configured to determine the NAN identifier based on the NAN frame. The determining circuit can be configured to perform at least block 1404 of FIG. 14. The determining circuit can include one or more of the processor 204 (FIG. 2), and the memory 206 (FIG. 2). In some implementations, means for determining can include the determining circuit.

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element can precede the second element in some manner. Also, unless stated otherwise a set of elements can include one or more elements.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-9 can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communicating in a neighborhood aware network (NAN), the method comprising:
generating a NAN frame comprising one or more of:
a first address field, comprising a receiver address field;
a second address field, comprising a transmitter address field; or
a third address field, comprising a destination address field or a basic service set identifier (BSSID) field;
encoding a NAN identifier comprising at least a cluster identifier in the NAN frame;
encoding an information element comprising a master preference number of a transmitting device in the NAN frame, the master preference number being determined at least in part on whether the transmitting device is receiving power from an external power source;
receiving, by the transmitting device, a master preference number associated with a device in the NAN; and
transmitting the NAN frame if the master preference number of the transmitting device is greater than the master preference number associated with the device.

2. The method of claim 1, wherein:
the NAN frame comprises a synchronization beacon or discovery frame;
the first address field comprises the cluster identifier having a group-cast indication;
the second address field comprises a source address; and
the third address field comprises a value indicating that the frame is a NAN frame.

3. The method of claim 2, wherein the value indicating that the frame is a NAN frame comprises a value of 0xFF appended to an organizationally unique identifier (OUI) indicative of a NAN frame.

4. The method of claim 1, wherein:
the NAN frame comprises a synchronization beacon or discovery frame;
the first address field comprises a value indicating that the frame is a NAN frame;
the second address field comprises a source address; and
the third address field comprises the cluster identifier.

5. The method of claim 1, wherein:
the NAN frame comprises a multicast discovery frame;
the first address field comprises the cluster identifier having a group-cast indication;
the second address field comprises a source address; and
the third address field comprises a value indicating that the frame is a NAN frame.

6. The method of claim 1, wherein:
the NAN frame comprises a multicast discovery frame;
the first address field comprises a value indicating that the frame is a NAN frame;
the second address field comprises a source address; and
the third address field comprises the cluster identifier.

7. The method of claim 1, wherein:
the NAN frame comprises a unicast discovery frame;
the first address field comprises a destination address;
the second address field comprises a source address; and
the third address field comprises the cluster identifier having a unicast indication.

8. The method of claim 1, wherein the NAN frame comprises a frame control field, followed directly by a duration field, followed directly by the first address field, followed directly by the second address field, followed directly by the third address field.

9. The method of claim 1, wherein the third address field comprises a destination address field.

10. The method of claim 1, wherein the third address field comprises a BSSID field.

11. The method of claim 1, wherein the NAN identifier comprises an organizationally unique identifier (OUI) indicative of a NAN frame.

12. The method of claim 11, wherein the NAN identifier further comprises one or more bits comprising a hash of an application identifier.

13. The method of claim 11, wherein the NAN identifier further comprises a least-significant octet indicative of a specific NAN.

14. The method of claim 11, wherein the NAN identifier further comprises a least-significant octet indicative of a wildcard NAN.

15. The method of claim 11, wherein the NAN identifier further comprises a secondary identifier indicative of a NAN frame, and the NAN frame further comprises a subsequent field indicative of a specific NAN.

16. The method of claim 1, further comprising:
setting a multicast flag of the NAN identifier when the NAN identifier is encoded in the first address field; and
unsetting the multicast flag when the NAN identifier is encoded in the second address field.

17. The method of claim 1, further comprising:
identifying one or more NAN characteristics; and
encoding the one or more NAN characteristics in the NAN identifier.

18. The method of claim 17, wherein the one or more NAN characteristics comprise one or more of: an identifier that the NAN frame is a NAN frame, the cluster identifier, one or more NAN cluster parameters, a discovery window indicator, a discovery period indicator, a discovery channel indicator, a device capability indicator, a window information indicator, a NAN basic service set identifier, a cluster size indication or estimate, a clock accuracy indication, and a clock type indication.

19. A device configured to communicate in a neighborhood aware network (NAN), the device comprising:
a processor configured to:
generate a NAN frame comprising one or more of:
a first address field, comprising a receiver address field;
a second address field, comprising a transmitter address field; or
a third address field, comprising a destination address field or a basic service set identifier (BSSID) field; and
encode a NAN identifier comprising at least a cluster identifier in the NAN frame; and
encode an information element comprising a master preference number of the device in the NAN frame, the master preference number being determined at least in part on whether the device is receiving power from an external power source;
a receiver configured to receive a master preference number associated with another device in the NAN; and
a transmitter configured to transmit the NAN frame if the master preference number of the device is greater than the master preference number associated with the another device.

20. The device of claim 19, wherein:
the NAN frame comprises a synchronization beacon or discovery frame;

the first address field comprises the cluster identifier having a group-cast indication;
the second address field comprises a source address; and
the third address field comprises a value indicating that the frame is a NAN frame.

21. The device of claim 20, wherein the value indicating that the frame is a NAN frame comprises a value of 0xFF appended to an organizationally unique identifier (OUI) indicative of a NAN frame.

22. The device of claim 19, wherein:
the NAN frame comprises a synchronization beacon or discovery frame;
the first address field comprises a value indicating that the frame is a NAN frame;
the second address field comprises a source address; and
the third address field comprises the cluster identifier.

23. The device of claim 19, wherein:
the NAN frame comprises a multicast discovery frame;
the first address field comprises the cluster identifier having a group-cast indication;
the second address field comprises a source address; and
the third address field comprises a value indicating that the frame is a NAN frame.

24. The device of claim 19, wherein:
the NAN frame comprises a multicast discovery frame;
the first address field comprises a value indicating that the frame is a NAN frame;
the second address field comprises a source address; and
the third address field comprises the cluster identifier.

25. The device of claim 19, wherein:
the NAN frame comprises a unicast discovery frame;
the first address field comprises a destination address;
the second address field comprises a source address; and
the third address field comprises the cluster identifier having a unicast indication.

26. The device of claim 19, wherein the NAN frame comprises a frame control field, followed directly by a duration field, followed directly by the first address field, followed directly by the second address field, followed directly by the third address field.

27. The device of claim 19, wherein the third address field comprises a destination address field.

28. The device of claim 19, wherein the third address field comprises a BSSID field.

29. The device of claim 28, wherein the NAN identifier further comprises one or more bits comprising a hash of an application identifier.

30. The device of claim 28, wherein the NAN identifier further comprises a least-significant octet indicative of a specific NAN.

31. The device of claim 28, wherein the NAN identifier further comprises a least-significant octet indicative of a wildcard NAN.

32. The device of claim 28, wherein the NAN identifier further comprises a secondary identifier indicative of a NAN frame, and the NAN frame further comprises a subsequent field indicative of a specific NAN.

33. The device of claim 19, wherein the NAN identifier comprises an organizationally unique identifier (OUI) indicative of a NAN frame.

34. The device of claim 19, wherein the processor is further configured to:
set a multicast flag of the NAN identifier when the NAN identifier is encoded in the first address field; and
unset the multicast flag when the NAN identifier is encoded in the second address field.

35. The device of claim 19, wherein the processor is further configured to:
identify one or more NAN characteristics; and
encode the one or more NAN characteristics in the NAN identifier.

36. The device of claim 35, wherein the one or more NAN characteristics comprise one or more of: an identifier that the NAN frame is a NAN frame, the cluster identifier, one or more NAN cluster parameters, a discovery window indicator, a discovery period indicator, a discovery channel indicator, a device capability indicator, a window information indicator, a NAN basic service set identifier, a cluster size indication or estimate, a clock accuracy indication, and a clock type indication.

37. An apparatus for communicating in a neighborhood aware network (NAN), the apparatus comprising:
means for generating a NAN frame comprising one or more of:
a first address field, comprising a receiver address field;
a second address field, comprising a transmitter address field; or
a third address field, comprising a destination address field or a basic service set identifier (BSSID) field;
means for encoding a NAN identifier comprising at least a cluster identifier in the NAN frame;
means for encoding an information element comprising a master preference number of the apparatus, the master preference number being determined at least in part on whether the apparatus is receiving power from an external power source;
means for receiving a master preference number associated with a device in the NAN; and
means for transmitting the NAN frame if the master preference number of the apparatus is greater than the master preference number associated with the device.

38. The apparatus of claim 37, further comprising:
means for setting a multicast flag of the NAN identifier when the NAN identifier is encoded in the first address field; and
means for unsetting the multicast flag when the NAN identifier is encoded in the second address field.

39. The apparatus of claim 37, further comprising:
means for identifying one or more NAN characteristics; and
means for encoding the one or more NAN characteristics in the NAN identifier.

40. A non-transitory computer-readable medium comprising code that, when executed, causes an apparatus to:
generate a neighborhood aware network (NAN) frame comprising one or more of:
a first address field, comprising a receiver address field;
a second address field, comprising a transmitter address field; or
a third address field, comprising a destination address field or a basic service set identifier (BSSID) field;
encode a NAN identifier comprising at least a cluster identifier in the NAN frame;
encode an information element comprising a master preference number of the apparatus in the NAN frame, the master preference number being determined at least in part on whether the apparatus is receiving power from an external power source;
receive a master preference number associated with a device in the NAN; and
transmit the NAN frame if the master preference number of the apparatus is greater than the master preference number associated with the device.

41. The medium of claim 40, further comprising code that, when executed, causes the apparatus to:
set a multicast flag of the NAN identifier when the NAN identifier is encoded in the first address field; and
unset the multicast flag when the NAN identifier is encoded in the second address field.

42. The medium of claim 40, further comprising code that, when executed, causes the apparatus to:
identify one or more NAN characteristics; and
encode the one or more NAN characteristics in the NAN identifier.

43. A method of communicating in a neighborhood aware network (NAN), the method comprising:
receiving, by an apparatus, a NAN frame comprising one or more of:
a first address field, comprising a receiver address field;
a second address field, comprising a transmitter address field; or
a third address field, comprising a destination address field or a basic service set identifier (BSSID) field;
determining a NAN identifier comprising at least a cluster identifier in the NAN frame;
determining an information element comprising a master preference number of a transmitting device of the NAN frame, the master preference number being determined at least in part on whether the transmitting device is receiving power from an external power source; and
transmitting a synch frame if a master preference number associated with the apparatus is greater than a master preference number of the transmitting device.

44. The method of claim 43, wherein:
the NAN frame comprises a synchronization beacon or discovery frame;
the first address field comprises the cluster identifier having a group-cast indication;
the second address field comprises a source address; and
the third address field comprises a value indicating that the frame is a NAN frame.

45. The method of claim 44, wherein the value indicating that the frame is a NAN frame comprises a value of 0xFF appended to an organizationally unique identifier (OUI) indicative of a NAN frame.

46. The method of claim 43, wherein:
the NAN frame comprises a synchronization beacon or discovery frame;
the first address field comprises a value indicating that the frame is a NAN frame;
the second address field comprises a source address; and
the third address field comprises the cluster identifier.

47. The method of claim 43, wherein:
the NAN frame comprises a multicast discovery frame;
the first address field comprises the cluster identifier having a group-cast indication;
the second address field comprises a source address; and
the third address field comprises a value indicating that the frame is a NAN frame.

48. The method of claim 43, wherein:
the NAN frame comprises a multicast discovery frame;
the first address field comprises a value indicating that the frame is a NAN frame;
the second address field comprises a source address; and
the third address field comprises the cluster identifier.

49. The method of claim 43, wherein:
the NAN frame comprises a unicast discovery frame;
the first address field comprises a destination address;
the second address field comprises a source address; and
the third address field comprises the cluster identifier having a unicast indication.

50. The method of claim 43, wherein the NAN frame comprises a frame control field, followed directly by a duration field, followed directly by the first address field, followed directly by the second address field, followed directly by the third address field.

51. The method of claim 43, wherein the third address field comprises a destination address field.

52. The method of claim 43, wherein the third address field comprises a BSSID field.

53. The method of claim 52, wherein the NAN identifier further comprises one or more bits comprising a hash of an application identifier.

54. The method of claim 52, wherein the NAN identifier further comprises a least-significant octet indicative of a specific NAN.

55. The method of claim 52, wherein the NAN identifier further comprises a least-significant octet indicative of a wildcard NAN.

56. The method of claim 52, wherein the NAN identifier further comprises a secondary identifier indicative of a NAN frame, and the NAN frame further comprises a subsequent field indicative of a specific NAN.

57. The method of claim 43, wherein the NAN identifier comprises an organizationally unique identifier (OUI) indicative of a NAN frame.

58. The method of claim 43, wherein:
a multicast flag of the NAN identifier is set when the NAN identifier is encoded in the first address field; and
the multicast flag is unset when the NAN identifier is encoded in the second address field.

59. The method of claim 43, further comprising:
decoding one or more NAN characteristics in the NAN identifier; and
applying one or more NAN characteristics.

60. The method of claim 59, wherein the one or more NAN characteristics comprise one or more of: an identifier that the NAN frame is a NAN frame, the cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

61. A device configured to communicate in a neighborhood aware network (NAN), the device comprising:
a receiver configured to receive a NAN frame comprising one or more of:
a first address field, comprising a receiver address field;
a second address field, comprising a transmitter address field; or
a third address field, comprising a destination address field or a basic service set identifier (BSSID) field;
a processor configured to:
determine a NAN identifier comprising at least a cluster identifier in the NAN frame; and
determine an information element comprising a master preference number of a transmitting device of the NAN frame, the master preference number being determined at least in part on whether the transmitting device is receiving power from an external power source; and a transmitter configured to transmit a synch frame if a master preference number associated with the device is greater than a master preference number of the transmitting device.

62. The device of claim 61, wherein:
the NAN frame comprises a synchronization beacon or discovery frame;
the first address field comprises the cluster identifier having a group-cast indication;
the second address field comprises a source address; and
the third address field comprises a value indicating that the frame is a NAN frame.

63. The device of claim 62, wherein the value indicating that the frame is a NAN frame comprises a value of 0xFF appended to an organizationally unique identifier (OUI) indicative of a NAN frame.

64. The device of claim 61, wherein:
the NAN frame comprises a synchronization beacon or discovery frame;
the first address field comprises a value indicating that the frame is a NAN frame;
the second address field comprises a source address; and
the third address field comprises the cluster identifier.

65. The device of claim 61, wherein:
the NAN frame comprises a multicast discovery frame;
the first address field comprises the cluster identifier having a group-cast indication;
the second address field comprises a source address; and
the third address field comprises a value indicating that the frame is a NAN frame.

66. The device of claim 61, wherein:
the NAN frame comprises a multicast discovery frame;
the first address field comprises a value indicating that the frame is a NAN frame;
the second address field comprises a source address; and
the third address field comprises the cluster identifier.

67. The device of claim 61, wherein:
the NAN frame comprises a unicast discovery frame;
the first address field comprises a destination address;
the second address field comprises a source address; and
the third address field comprises the cluster identifier having a unicast indication.

68. The device of claim 61, wherein the NAN frame comprises a frame control field, followed directly by a duration field, followed directly by the first address field, followed directly by the second address field, followed directly by the third address field.

69. The device of claim 61, wherein the third address field comprises a destination address field.

70. The device of claim 61, wherein the third address field comprises a BSSID field.

71. The device of claim 70, wherein the NAN identifier further comprises one or more bits comprising a hash of an application identifier.

72. The device of claim 70, wherein the NAN identifier further comprises a least-significant octet indicative of a specific NAN.

73. The device of claim 70, wherein the NAN identifier further comprises a least-significant octet indicative of a wildcard NAN.

74. The device of claim 70, wherein the NAN identifier further comprises a secondary identifier indicative of a NAN frame, and the NAN frame further comprises a subsequent field indicative of a specific NAN.

75. The device of claim 61, wherein the NAN identifier comprises an organizationally unique identifier (OUI) indicative of a NAN frame.

76. The device of claim 61, wherein:
a multicast flag of the NAN identifier is set when the NAN identifier is encoded in the first address field; and
the multicast flag is unset when the NAN identifier is encoded in the second address field.

77. The device of claim 61, wherein the processor is further configured to:
decode one or more NAN characteristics in the NAN identifier; and
apply one or more NAN characteristics.

78. The device of claim 77, wherein the one or more NAN characteristics comprise one or more of: an identifier that the NAN frame is a NAN frame, the cluster identifier, one or more NAN cluster parameters, a discovery window indicator, a discovery period indicator, a discovery channel indicator, a master preference number of a transmitting device, a device capability indicator, a window information indicator, a NAN basic service set identifier, a cluster size indication or estimate, a clock accuracy indication, and a clock type indication.

79. An apparatus for communicating in a neighborhood aware network (NAN), the apparatus comprising:
means for receiving a NAN frame comprising one or more of:
a first address field, comprising a receiver address field;
a second address field, comprising a transmitter address field; or
a third address field, comprising a destination address field or a basic service set identifier (BSSID) field;
means for determining a NAN identifier comprising at least a cluster identifier in the NAN frame;
means for determining an information element comprising a master preference number of a transmitting device of the NAN frame, the master preference number being determined at least in part on whether the transmitting device is receiving power from an external power source; and
means for transmitting a synch frame if a master preference number associated with the apparatus is greater than a master preference number of the transmitting device.

80. The apparatus of claim 79, further comprising a processor configured to:
decode one or more NAN characteristics in the NAN identifier; and
apply one or more NAN characteristics.

81. A non-transitory computer-readable medium comprising code that, when executed, causes an apparatus to:
receive a neighborhood aware network (NAN) frame comprising one or more of:
a first address field, comprising a receiver address field;
a second address field, comprising a transmitter address field; or
a third address field, comprising a destination address field or a basic service set identifier (BSSID) field; and
determine a NAN identifier, comprising at least a cluster identifier in the NAN frame;
determine an information element comprising a master preference number of a transmitting device of the NAN frame, the master preference number being determined at least in part on whether the transmitting device is receiving power from an external power source; and
transmit a synch frame if a master preference number associated with the apparatus is greater than a master preference number of the transmitting device.

82. The medium of claim 81, further comprising code that, when executed, causes the apparatus to:
- decode one or more NAN characteristics in the NAN identifier; and
- apply one or more NAN characteristics.

\* \* \* \* \*